(12) United States Patent
Mizuki et al.

(10) Patent No.: US 9,185,187 B2
(45) Date of Patent: Nov. 10, 2015

(54) POSTED INFORMATION SHARING

(71) Applicant: NINTENDO CO., LTD., Kyoto (JP)

(72) Inventors: Kiyoshi Mizuki, Kyoto (JP); Hideto Yuzawa, Kyoto (JP); Shunsaku Kato, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 13/768,793

(22) Filed: Feb. 15, 2013

(65) Prior Publication Data

US 2013/0326011 A1 Dec. 5, 2013

Related U.S. Application Data

(63) Continuation of application No. 13/750,473, filed on Jan. 25, 2013.

(30) Foreign Application Priority Data

May 31, 2012 (JP) ................. 2012-124651

(51) Int. Cl.
*G06F 15/16* (2006.01)
*H04L 29/06* (2006.01)
*G06F 9/445* (2006.01)
*H04L 29/08* (2006.01)
*H04L 12/58* (2006.01)

(52) U.S. Cl.
CPC ............ *H04L 67/42* (2013.01); *G06F 9/44505* (2013.01); *H04L 29/0809* (2013.01); *H04L 51/32* (2013.01); *H04L 12/588* (2013.01)

(58) Field of Classification Search
CPC ... H04L 12/588; H04L 51/32; H04L 29/0809; H04L 67/104

USPC ......... 709/201, 202, 203, 204, 205, 206, 217, 709/219

See application file for complete search history.

(56) References Cited

U.S. PATENT DOCUMENTS

| | | | |
|---|---|---|---|
| 6,900,807 B1 | 5/2005 | Liongosari et al. | |
| 6,904,449 B1 | 6/2005 | Quinones | |
| 7,512,655 B2 | 3/2009 | Armstrong et al. | |
| 7,742,585 B2 | 6/2010 | Otaka et al. | |
| 7,814,225 B2 | 10/2010 | Rumelhart | |
| 8,166,026 B1 * | 4/2012 | Sadler | 707/725 |
| 8,311,382 B1 * | 11/2012 | Harwell et al. | 386/200 |
| 8,347,381 B1 * | 1/2013 | Gauvin | 726/22 |
| 8,715,091 B1 | 5/2014 | Hashimoto et al. | |

(Continued)

OTHER PUBLICATIONS

Extended European Search Report dated Sep. 27, 2013, issued in corresponding European Application No. EP 13152457.

(Continued)

*Primary Examiner* — Dhairya A Patel
(74) *Attorney, Agent, or Firm* — Nixon & Vanderhye P.C.

(57) ABSTRACT

An exemplary posted information sharing system includes: an information-processing system; and a server, wherein the information-processing device includes an executing unit that executes an application program, and an accessing unit that accesses an item of posted information depending on the application program that is being executed or whose execution is suspended, the posted information being stored on the server, and the server includes a providing unit that provides access to the posted information by the information-processing device, in response to a request from the accessing unit.

4 Claims, 16 Drawing Sheets

(56) References Cited

U.S. PATENT DOCUMENTS

| | | |
|---|---|---|
| 2002/0094069 A1 | 7/2002 | Takahashi et al. |
| 2004/0176170 A1 | 9/2004 | Eck et al. |
| 2005/0144032 A1 | 6/2005 | Shimoda et al. |
| 2006/0080702 A1 | 4/2006 | Diez et al. |
| 2006/0160622 A1 | 7/2006 | Lee et al. |
| 2006/0173929 A1* | 8/2006 | Wilson .................. 707/201 |
| 2006/0184617 A1* | 8/2006 | Nicholas et al. .......... 709/203 |
| 2006/0232795 A1 | 10/2006 | Tsuboi et al. |
| 2007/0244987 A1 | 10/2007 | Pedersen et al. |
| 2007/0265972 A1 | 11/2007 | Tsutsui |
| 2008/0119281 A1 | 5/2008 | Hirose et al. |
| 2009/0150486 A1* | 6/2009 | Franco et al. ............ 709/203 |
| 2009/0232141 A1* | 9/2009 | Fersman et al. .......... 370/395.1 |
| 2009/0248804 A1* | 10/2009 | Ohtani .................. 709/204 |
| 2010/0009747 A1* | 1/2010 | Reville et al. ............ 463/31 |
| 2010/0035692 A1* | 2/2010 | Reville et al. ............ 463/42 |
| 2010/0293221 A1 | 11/2010 | Sidman et al. |
| 2011/0060797 A1 | 3/2011 | Balandin et al. |
| 2011/0252006 A1* | 10/2011 | Smith et al. ............ 707/691 |
| 2012/0072871 A1 | 3/2012 | Seo et al. |
| 2012/0136959 A1* | 5/2012 | Kadam et al. ............ 709/217 |
| 2013/0212526 A1 | 8/2013 | Park et al. |
| 2013/0325925 A1 | 12/2013 | Mizuki et al. |
| 2013/0325957 A1 | 12/2013 | Mizuki et al. |
| 2013/0326011 A1 | 12/2013 | Mizuki et al. |
| 2014/0143303 A1 | 5/2014 | Wabe et al. |

OTHER PUBLICATIONS

Office Action dated Feb. 12, 2015, issued in related U.S. Appl. No. 13/750,473.

"To start Nintendo eShop?", http://www.nintendo.co.jp/3ds/eshop/howto/index.html, and the English translation thereof, 4 pages.

Home page, Wikipedia, en.wikipedia.org, May 30, 2012, XP055079714, 1 page.

User agent, Wikipedia, en.wikipedia.org, May 2, 2012, XP055079716, 5 pages.

Extended European Search Report dated Sep. 20, 2013, issued in European Application No. 13155579, 7 pages.

Extended European Search Report dated Sep. 27, 2013, issued in European Application No. 13152457, 6 pages.

Office Action dated Sep. 8, 2015, issued in related U.S. Appl. No. 13/750,473.

* cited by examiner

| POST ID | TIME STAMP | APPLICATION ID | USER ID | TEXT | BINARY DATA | TAG |
|---|---|---|---|---|---|---|
| 351245 | 2012/3/19 21:09 | AAA001 | TARO YAMADA | I GOT A SECRET SWORD IN THE VILLAGE. | 010010000... | 53 HRS, VILLAGE |
| 351244 | 2012/3/19 18:15 | ABB007 | HANAKO SATO | I GOT A TIME SCORE 2:35:002 ON STAGE 5. | 010111110... | 12 HRS, STAGE 5 |
| 351243 | 2012/3/19 16:25 | AAA001 | HANAKO SATO | THE BOSS IN THE VALLEY OF MOUNTAIN IS TOO. | (NA) | 31 HRS, THE VALLEY OF MOUNTAIN |
| 351242 | 2012/3/19 14:55 | AAA001 | HANAKO SATO | I LEFT THE VILLAGE. | (NA) | 29 HRS, VILLAGE |
| 351241 | 2012/3/19 11:31 | AAA001 | ICHIRO SUZUKI | THIS GAME IS VERY DIVERTING. | (NA) | 35 HRS, CHURCH |
| ... | ... | ... | ... | ... | ... | ... |

FIG. 11

| COMMUNITY ID | TITLE | APPLICATION ID | ATTRIBUTE INFORMATION | | |
|---|---|---|---|---|---|
| | | | USER WHO GENERATE THE SUBJECT COMMUNITY | NUMBER OF MEMBERS | URL |
| 000001 | THE LEGEND OF XYZ OFFICIAL COMMUNITY | AAA001 | OFFICIAL | 3568 | http://www.shopserver.com/xyz-shop.htm |
| 000002 | CLUB THE LEGEND OF XYZ | AAA001 | HANAKO SATO | 251 | http://www.shopserver.com/xyz-shop.htm |
| 000003 | TEAM XYZ | AAA001 | John Smith | 1075 | http://www.shopserver.com/xyz-shop.htm |
| 000004 | CART RACE OFFICIAL COMMUNITY | ABB007 | OFFICIAL | 9248 | http://www.shopserver.com/cartrace-shop.htm |
| 000005 | RACE MANIA | ABB007 | ICHIRO SUZUKI | 26 | http://www.shopserver.com/cartrace-shop.htm |
| ... | ... | ... | ... | ... | ... |

FIG. 14

| APPLICATION ID | ATTRIBUTE INFORMATION | |
|---|---|---|
| | TITLE | URL |
| AAA001 | THE LEGEND OF XYZ | http://www.shopserver.com/xyz-shop.htm |
| ABB007 | CART RACE | http://www.shopserver.com/cartrace-shop.htm |
| CDF507 | EVERYBODY'S PARTY | http://www.shopserver.com/party-shop.htm |
| ... | ... | ... |

POSTED INFORMATION SHARING

CROSS REFERENCE TO RELATED APPLICATIONS

This application is a continuation of U.S. application Ser. No. 13/750,473, filed Jan. 25, 2013, now pending, the entire contents of which is hereby incorporated by reference in this application, which is based on and claims priorities under 35 USC 119 from Japanese patent application No. 2012-124651, which was filed on May 31, 2012.

FIELD

This application relates to sharing posted information via a network.

BACKGROUND AND SUMMARY

An information-processing system for sharing information with other users via communication function is known.

The disclosure herein provides improved technology.

There is provided a posted information sharing system including: an information-processing system; and a server, wherein the information-processing system includes an executing unit that executes an application program, and an accessing unit that accesses an item of posted information depending on the application program that is being executed or whose execution is suspended, the posted information being stored on the server, and the server includes a providing unit that provides access to the posted information by the information-processing device, in response to a request from the accessing unit.

BRIEF DESCRIPTION OF THE DRAWINGS

Exemplary embodiments will be described with reference to the following drawings, wherein:

FIG. 11 shows an example of data stored in posted information database 212;

FIG. 14 shows an example of a community list;

DETAILED DESCRIPTION OF NON-LIMITING EXEMPLARY EMBODIMENTS

1. Outline

Figure 1:
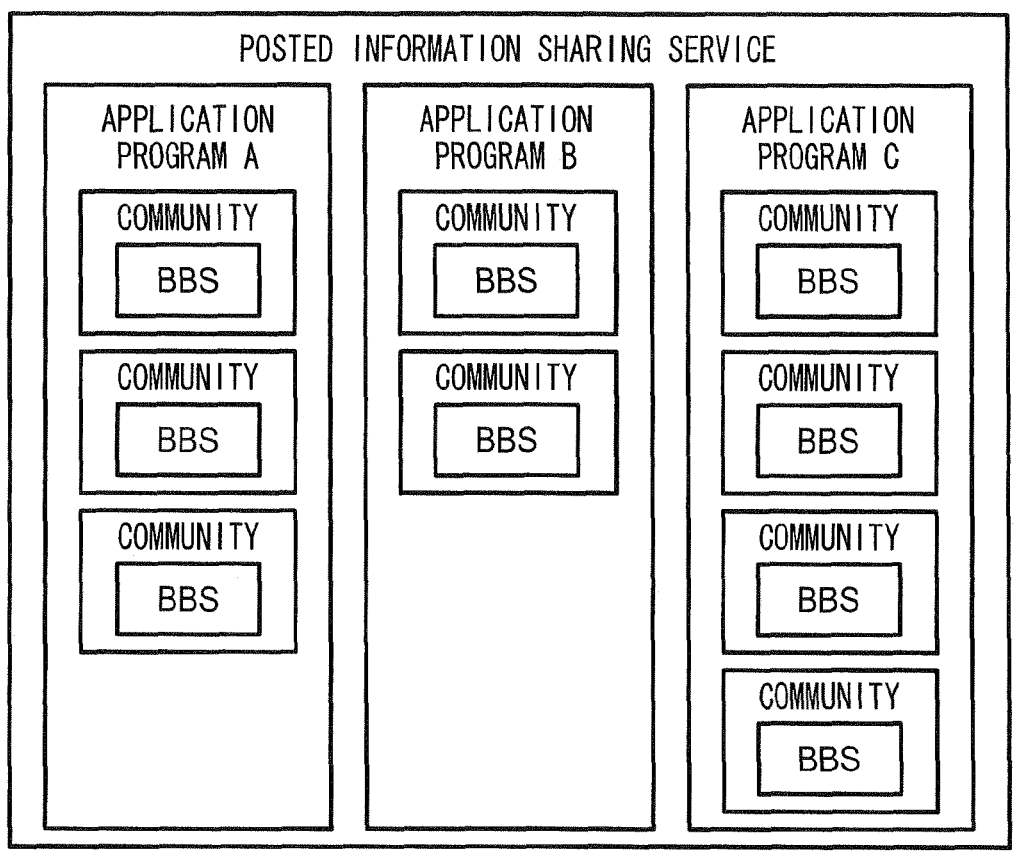
FIG. 1 shows an outline of a posted information sharing system according to an exemplary embodiment.

FIG. 1 shows an outline of posted information sharing system according to an exemplary embodiment. A service provided by the posted information sharing system (hereinafter, referred to as "posted information sharing service") includes, for example, a so-called electronic bulletin board system (hereinafter, the electronic bulletin board is simply referred to as "bulletin board"). The bulletin board is a system for receiving posted information posted by a user from a terminal and storing the posted information, as well as providing the posted information in a browsable format to a user who accesses a server from a terminal. It is to be noted that a server function may be provided by a single server device or a group of server devices. The posted information sharing system may share the posted information by use of another system, for example, by providing access by another user to a web site unique to a user, to which the user posts information, or by providing a system for another user to post comments on the posted information. According to the bulletin board system, at least one unique bulletin board is provided for every application program. Further, each application program has at least one unique community relating to the application program. It is to be noted that each application program may have plural unique communities. A community is, for example, a group of users (in other words, a set of plural users). A user who belongs to a community is referred to as a member of the community. In this example, at least one unique bulletin board is provided for each community.

In this example, at least one community is provided for each application program. In other words, a provider or an operator of the posted information sharing system generates on a server at least one unique community for each application program. More specifically, when a new application program is released, the provider or the operator generates on a server at least one unique community for the new application program. Thus, at least one unique community and at least one unique bulletin board is provided by a server for every commercially available application program (in other words, every application program in use). n communities (n is a natural number that satisfies n>=1) correspond to an application program. In the example shown in FIG. 1, three communities exist for application program A, and two communities exist for application program B. Each community has a communication tool (for example, a bulletin board) for communicating with other members. A member communicates a message such as an opinion, an impression, a question, a comment, and so on, with other members. In other words, a user of the posted information sharing system can browse comments of other members, share his/her comments, or exchange messages with other members.

A user of the posted information sharing system can establish a relationship with another user as a "friend." The term "friends" refers to a relationship between two users who have agreed via the posted information sharing system to be friends with each other.

Figure 2:
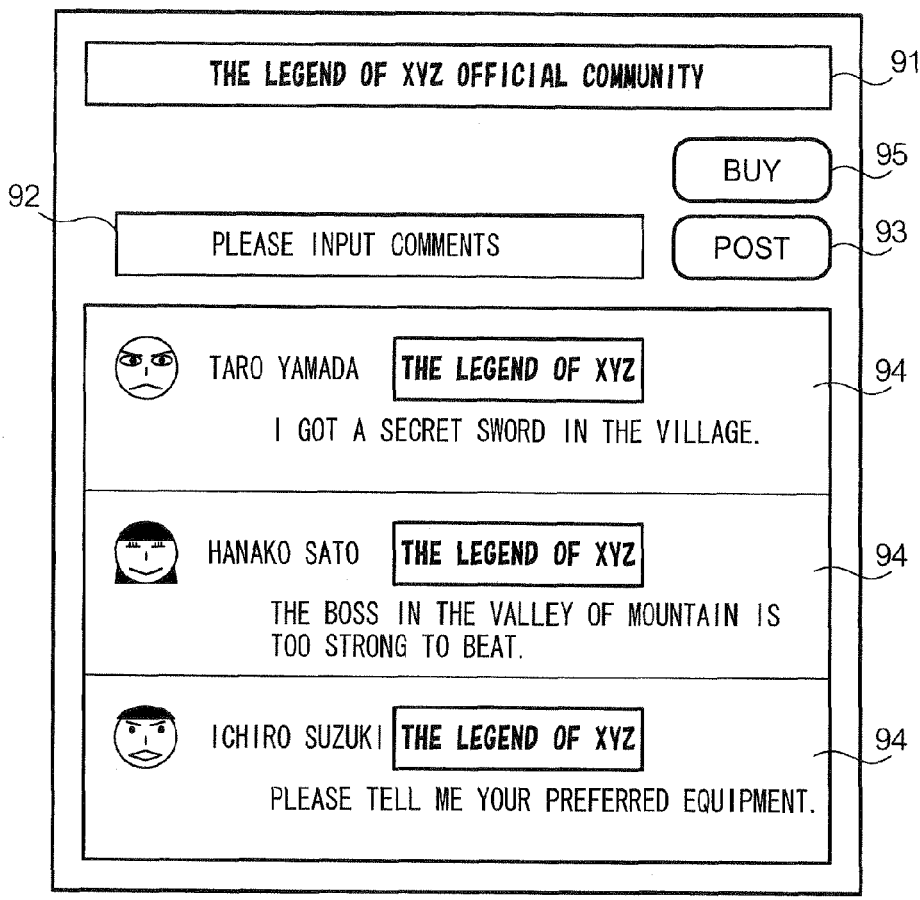
FIG. 2 shows an example of a screen image of a posted information sharing service.

FIG. 2 shows an example of a screen image of the posted information sharing service; more specifically, it shows a screen image of the communication tool in a community. The image includes title 91, text box 92, post button 93, plural items of posted information 94, and buy button 95. In other words, the image includes a user interface for the bulletin board system. Title 91 shows a title of the community. In this example, the application program is a program for providing a video game (in other words, a game application), and title 91 includes information (at least one of text and image) for identifying the application program to which the community belongs. In this example, title 91 shows that the community relates to a game of "the Legend of XYZ." Text box 92 is used to input a text to be posted. Post button 93 is used to input an instruction to transmit data such as the text input in text box 92, to the posted information sharing system (server). Posted information 94 shows information posted by a user. Details of posted information 94 will be described later. Buy button 95 is used to input an instruction to access a web site on which a corresponding application program is sold.

Figure 3:
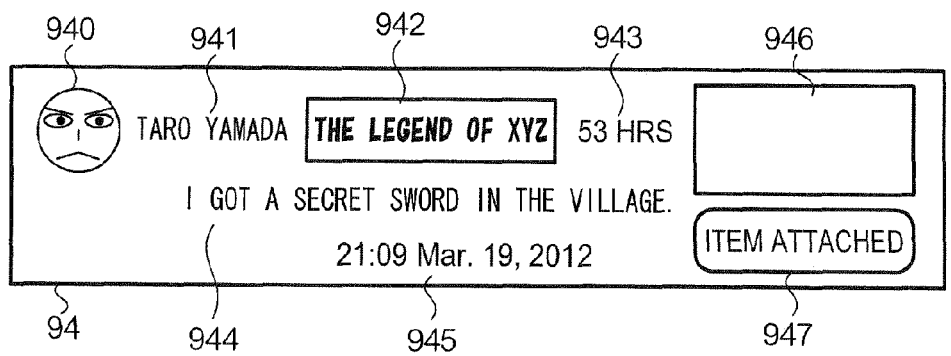
FIG. 3 shows exemplary details of posted information 94.

FIG. 3 shows exemplary details of posted information 94. Posted information 94 includes user image 940, user ID 941, application name 942, progress information 943, posted text 944, time stamp 945, screen shot image 946, and attached data image 947. User image 940 shows an image set up for a user who transmits this posted information 94. In this example, the user image is a so-called avatar image. User ID 941 denotes a name of a user who posts this posted information 94. Application name 942 denotes information identifying an application program that is in executing state in the user's information-processing device at the time an instruction to transmit this posted information 94 is made. Here, the term "being executed" includes a state in which execution of the application program is suspended or paused (in other words, the execution is temporarily disrupted) as well as a state in which the application program is being executed (in other words, the execution is sustained). Hereinafter, the application is referred to as an "application program being executed (at the time of transmission)."

Progress information 943 denotes a progress status of an application program in the progress status, for example, a stage number (stage name), a save point, or accumulated playing time of a game. Posted text 944 shows a text input by a user who posted this posted information 94. Time stamp 945 denotes a time when this posted information 94 was posted. Usually, posted text 944 is a text of an opinion, an impression, a question, or a comment relating to the application program being executed. In other words, posted text 944 is a text relating to an application program denoted by application name 942.

Screen shot image 946 is a screen shot image of an application program being executed. Attached data image 947 denotes whether data relating to this item of posted information 94 is attached. The attached data is generated by the application program being executed and shows, for example, a virtual object such as an item in a game.

In the example of posted information 94 shown in FIG. 3, it is shown that a user having a user ID "Taro Yamada" posted a text "I got a secret sword in the village." relating to a game "Legend of XYZ" at 21:09, Mar. 19, 2021.

It is to be noted that the posted information sharing service is an example of a service for providing the posted information. The posted information may be provided by, for example, a blog or a buzz marketing site. Further, in FIG. 1, a single service has plural communities relating to plural application programs. However, plural services, each of which is unique for an application program, for sharing the posted information may be provided.

It is to be noted that the posted information sharing service provides a user interface image independent of the application program as well as a user interface image corresponding to a community. A page referred to as "my page" is an example of the user interface image independent of the application program. In "my page," plural items of posted information posted by other users who are friends of the user or have association with the user, are shown in a single user interface image.

2. Configuration 2-1. Posted Information Sharing System 1

Figure 4:
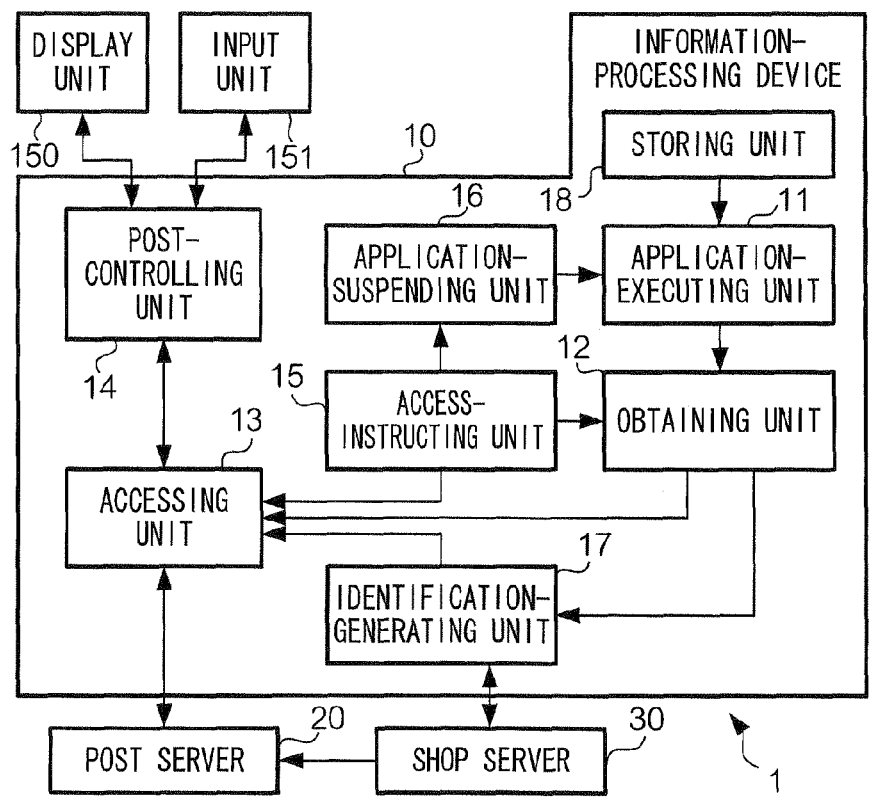
FIG. 4 shows an example of a configuration of posted information sharing system 1 according to one exemplary embodiment.

FIG. 4 shows an example of a configuration of posted information sharing system 1 according to one exemplary embodiment. Posted information sharing system 1 includes information-processing device 10, post server 20, and shop server 30. Post server 20 is a server device providing a posted information sharing service. Post server 20 includes a function to provide a bulletin board system. Post server 20 stores information posted (transmitted) from information-processing device 10 as the posted information. Further, if post server 20 receives a request for browsing the posted information, post server 20 provides the posted information. More specifically, when an item of information is posted, the item of posted information is stored in a resource (for example, a directory) corresponding to (dependent on) an application program being executed at the time of the post. Alternatively, all the posted information may be stored in a single resource with identification information of the application program being stored. Further, if post server 20 receives a request for browsing the posted information, post server 20 reads the requested posted information from corresponding resources in the post server 20, in response to an application program being executed. Thus, post server 20 provides the posted information to a terminal that transmits a request to browse the posted information. In posted information sharing system 1, each of plural users transmits his/her own posted information to post server 20 from his/her own information-processing device 10. Post server 20 stores the posted information transmitted from plural information-processing devices 10. Post server 20 transmits at least one item of posted information selected in response to a request from among the stored plural items of posted information, to information-processing device 10 that is a source of the request. The posted information includes, for example, text that is input by a user. The posted information includes text (character strings) and/or an image as an opinion, an impression, a question, a comment, or a message. Shop server 30 sells an application program by download via a network in response to a request from information-processing device 10.

Information-processing device 10 includes a function to execute at least one application program selected from plural application programs. Information-processing device 10 obtains identification information of an application program from among the plural application programs. Hereinafter, an application program that is being executed at the time a post instruction or a browse instruction is input, is referred to as an "application being executed." In the exemplary embodiment, information-processing device 10 accesses post server 20 after the application being executed is paused. Therefore, the application being executed is an application program that was being executed immediately prior to input of an instruction to access post server 20. In this example, information-processing device 10 obtains identification information of an application program that is paused at the time of the access. However, the application program may still be being executed at the time of the access. In such a case, information-processing device 10 obtains identification information of an application program that is being executed at the time of the access. Information-processing device 10 accesses a community corresponding to an application being executed, and displays results of the access. Here, "at the time an instruction to access post server 20 is made" includes a timing when an indirect instruction to access post server 20 is made, for example, when an instruction to display a menu image including an item to access post server 20 is made, as well as a timing when a direct instruction to access is made. Also, the "access to post server 20" includes access to transmit information and access to browse the posted information. Only one of these two accesses may be implemented in a single device or by a single software program. Here, "when an instruction to access is made" includes at least one of when an instruction to transmit the posted information is made and when an instruction to browse the posted information is made. Further, an "application being executed" includes at least one of an application program that is being executed and an application program whose execution is paused (suspended).

2-2. Information-Processing Device 10

Information-processing device 10 includes application-executing unit 11, obtaining unit 12, accessing unit 13, post-controlling unit 14, access-instructing unit 15, application-suspending unit 16, identification-generating unit 17, and storing unit 18. Display unit 150 displays an image showing a result of execution of a program such as an application program. Input unit 151 receives an input from a user. In this example, display unit 150 and input unit 151 are external functions of information-processing device 10. However, information-processing device 10 may include at least one of display unit 150 and input unit 151.

Various application programs for information-processing device 10 are commercially available. A user can purchase a desired application program so as to run the application program on the information-processing device 10. Information-processing device 10 can store in internal non-volatile memory plural application programs. In addition or instead, a user can freely select an application program to be executed, by changing a memory card in which an application program is stored, which memory card is removably inserted in information-processing device 10. Application-executing unit 11 is implemented by CPU 101 (described later) executing an application program (a user application program) that is freely selected and purchased or downloaded by a user. In other words, functions provided by application-executing unit 11 are implemented by codes described in a user application program. Obtaining unit 12 obtains identification information of a user application program that is in execution status by application-executing unit 11 (such an application program is referred to as an "application being executed" hereinafter). It is to be noted that, in this example, information-processing device 10 accesses post server 20 while execution of the user application program is suspended. Obtaining unit 12 may obtain identification information of a user application program that was being executed immediately before suspension of execution of the user application program, or may obtain identification information of a user application program whose execution is already suspended. Further, if information-processing device 10 accesses post server 20 without suspending the execution of the user application program, obtaining unit 12 may obtain identification information of the application program being executed. It is to be noted that, in the following description, obtaining unit 12 obtains from an OS identification information of the application being executed. However, obtaining unit 12 may obtain the identification information directly from the application program that is being executed. Accessing unit 13 accesses a community (more specifically, to post server 20) relating to a user application program identified by the identification information obtained by obtaining unit 12, from among plural communities provided by posted information sharing system 1. Post-controlling unit 14 controls display unit 150 to display posted information obtained from the community accessed by accessing unit 13. Further, post-controlling unit 14 transmits (posts) to the community posted information input by a user via input unit 151.

Access-instructing unit 15 instructs accessing unit 13 to access post server 20. In this example, obtaining unit 12 obtains identification information of the application program being executed when access-instructing unit 15 instructs accessing unit 13 to access post server 20.

Application-suspending unit 16 temporarily suspends the execution of the user application program when access-instructing unit 15 instructs accessing unit 13 to access post server 20. It is to be noted that parameters relating to the application program (for example, parameters showing a status in a game) are stored. Further, in response to an instruction by a user, the execution of the user application program is resumed (the stored parameters are used to resume the user application program). In this example, after the execution of the user application program is suspended, access-instructing unit 15 controls display unit 150 to display a menu image including items to instruct accessing unit 13 to access post server 20. Accessing unit 13 accesses post server 20 if an item to instruct accessing unit 13 to access post server 20 is selected from options shown in the menu image.

Identification-generating unit 17 generates community identification information, which identifies a community (or a bulletin board system) relating to a user application program identified by identification information obtained by obtaining unit 12. In this example, accessing unit 13 accesses a community by using the community identification information generated by identification-generating unit 17. More specifically, in this example, identification-generating unit 17 generates access information (for example, a URL (Uniform Resource Locator)) corresponding to the user application program identified by the obtained identification information, so as to access post server 20. It is to be noted that functions of obtaining unit 12, accessing unit 13, post-controlling unit 14, access-instructing unit 15, application-suspending unit 16, and identification-generating unit 17 are implemented by information-processing device 10 and not by application-executing unit 11, which is implemented by CPU 101 executing a user application program (for example, a game program). In other words, these functional units are not implemented by codes included in the user application program. More specifically, functions of these units are implemented by CPU 101 (or another processor) executing codes included in software for a platform of information-processing device 10. For example, functions of these units may be implemented by CPU 101 executing codes included in at least one software program preinstalled (prior to shipping of information-processing device 10) in information-processing device 10, software installed when information-processing device 10 is updated via a network, and system software. In this example, functions of obtaining unit 12, accessing unit 13, access-instructing unit 15, application-suspending unit 16, and identification-generating unit 17 are implemented by CPU 101 executing codes included in the system software. A function of post-controlling unit 14 is implemented by CPU 101 (or another processor) executing codes included in pre-installed software.

Storing unit 18 includes non-volatile memory and stores system software of information-processing device 10. The system software includes codes for holding program identification information identifying the application being executed, and codes for notifying obtaining unit 12 of the held program identification information. Obtaining unit 12 identifies the application being executed based on a notification of the program identification information obtained from the system software.

In this example, accessing unit 13 transmits to post server 20 the program identification information when accessing post server 20. It is to be noted that it is not always necessary to transmit the program identification information to post server 20 in a case of accessing a different URL, depending on the identified user application program.

Figure 5:
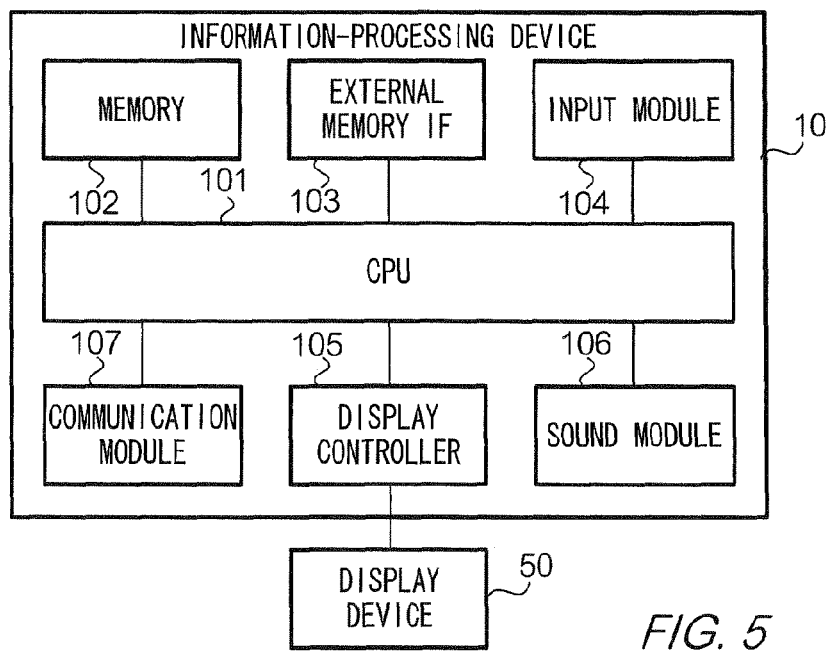
FIG. 5 shows an example of a hardware configuration of information-processing device 10.

FIG. 5 shows an example of a hardware configuration of information-processing device 10. In this example, information-processing device 10 is a game device for playing a video game. Information-processing device 10 is a computer device including CPU (Central Processing Unit) 101, memory 102, external memory IF 103, input module 104, display controller 105, sound module 106, and communication module 107. Information-processing device 10 is connected to display device 50. Display device 50 is a device for displaying information such as an image and/or a character string, and includes a display (liquid crystal display panel or organic electro-luminescence display panel) and a driver circuit thereof. In this example, information-processing device 10 is a so-called console type game device, which does not include display device 50. Display device 50 is an external device, such as a television. It is to be noted that information-processing device 10 may include display device 50.

CPU 101 is a device for controlling elements of information-processing device 10, and executes various processes or calculations. Memory 102 is a storage device for storing a program and data, such as RAM (Random Access Memory) and/or ROM (Read Only Memory), for example. External memory IF 103 is an interface for reading/writing data from/into an external storage medium (an optical disk, a magnetic disk, or a semiconductor memory, for example) that stores a program and/or data. Input module 104 includes an input device for inputting an instruction or command from a user to CPU 101, such as, for example, a keypad, buttons, a touch screen, a microphone, or a combination thereof. Display controller 105 is a device for controlling a display device to display information such as an image and/or a character string, such as an image processing circuit and an image signal output circuit. Sound module 106 includes a device for outputting a sound signal, such as a sound processing device and a sound signal output device. Communication module 107 includes a device for communicating with another device in a predetermined communication standard via a wired and/or a wireless network (for example, the Internet).

Figure 6:
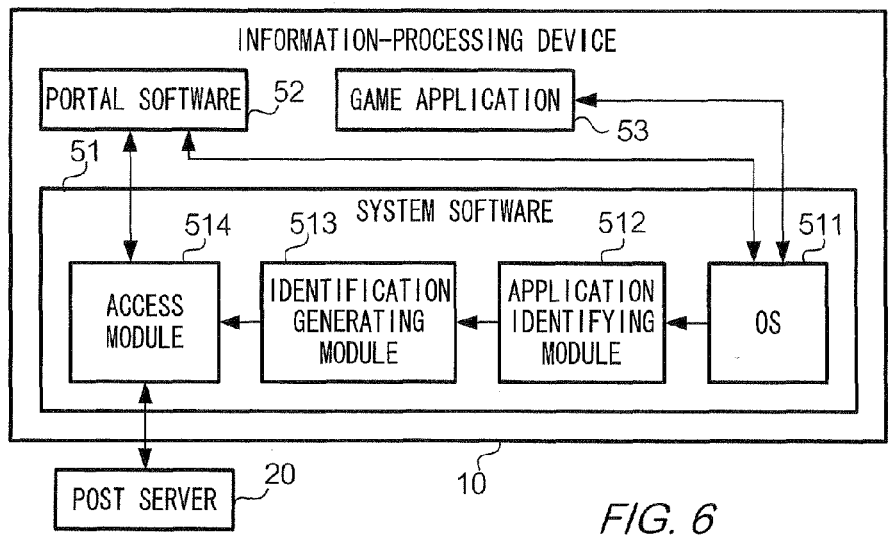
FIG. 6 shows an example of a software configuration of information-processing device 10.

FIG. 6 shows an example of a software configuration of information-processing device 10. Information-processing device 10 includes system software 51, portal software 52, and game application 53, which is an example of a user application program. In this example, system software 51 and portal software 52 are preinstalled in memory 102 before information-processing device 10 is shipped. In other words, system software 51 and portal software 52 are provided as functions of a platform of information-processing device 10. Game application 53 is stored in an external storage device. It is to be noted that game application 53 may be stored in memory 102. In another example, at least one of system software 51, portal software 52, and game application 53 may be downloaded via a network and may be updated to a most recent version via the network, as an alternative to the preinstall.

System software 51 is software for managing and/or controlling information-processing device 10. System software 51 is software necessary to execute an application program on information-processing device 10, and is required to be installed in information-processing device 10 during execution of an application program. In this example, system software 51 includes OS (Operating System) 511, application identifying module 512, identification generating module 513, and access module 514. System software 51 includes a set of codes to implement the functions of these modules. OS 511 is software to manage and/or control portal software 52 and a user application program such as game application 53. Application identifying module 512 identifies a user application program being executed. More specifically, application identifying module 512 obtains identification information (hereinafter referred to as an "application ID") of a user application program being executed. Identification generating module 513 generates identification information of a community relating to the application program identified by application identifying module 512. The identification information is, for example, a URL (Uniform Resource Locator) showing a resource of the community. Access module 514 communicates using the resource shown by the URL.

Portal software 52 is client software of the posted information sharing system, and provides a user interface for showing information to a user and receiving input of information by a user. Portal software 52 transmits a request to post server 20 via access module 514, and controls the display device to display an image relating to the posted information sharing system, using data transmitted from post server 20 in response to the request. The image relating to the posted information sharing system includes a UI (User Interface) for inputting, transmitting and displaying the posted information, and at least one item of posted information posted by at least one user.

Game application 53 is an application program (software) for implementing a video game on information-processing device 10. Information-processing device 10 has a function to execute at least one game application selected from various game programs. A program of game application 53 is stored, for example, in the external storage medium (an external memory). A user operates information-processing device to read a program stored in a storage medium that is selected by the user from among plural storage media storing different programs. Thus, the user causes information-processing device 10 to execute the selected game application. In another example, memory 102 stores plural programs. A user may select a program to be started, and cause information-processing device 10 to execute the selected game application.

CPU 101 executing a user application program is an example of application-executing unit 11. CPU 101 executing system software 51 is an example of obtaining unit 12, accessing unit 13, access-instructing unit 15, application-suspending unit 16, and identification-generating unit 17. CPU 101 executing portal software 52 is an example of post-controlling unit 14. At least one of memory 102 and the external memory is an example of storing unit 18. Display device 50 is an example of display unit 150.

2-3. Post Server 20

Figure 7:
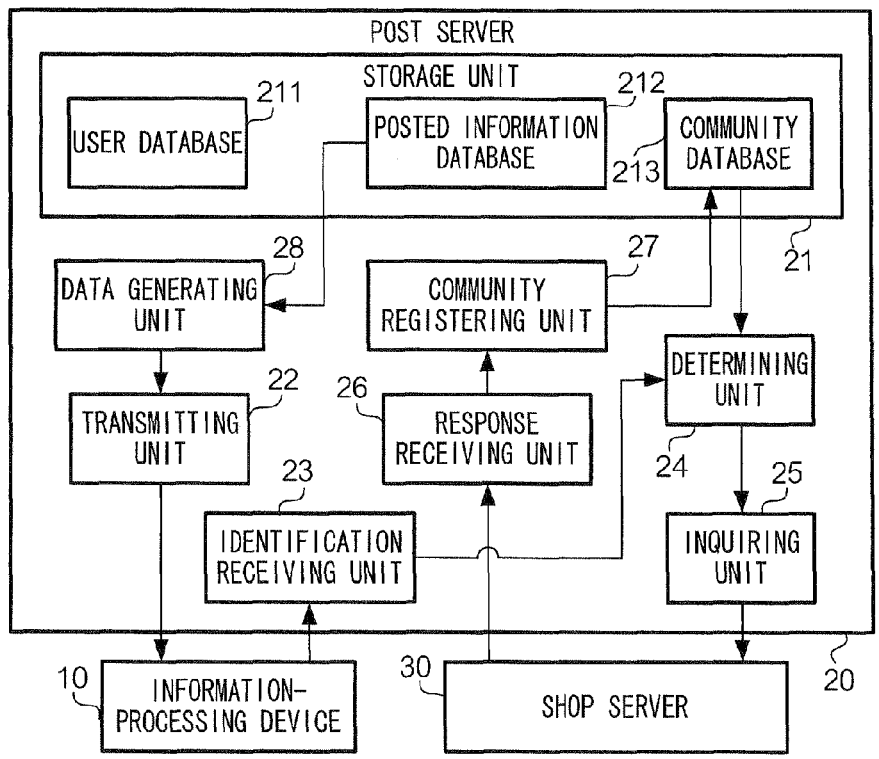
FIG. 7 shows an example of a functional configuration of post server 20.

FIG. 7 shows an example of a functional configuration of post server 20. Post server 20 includes storage unit 21 and transmitting unit 22. Storage unit 21 stores user database 211, posted information database 212, and community database 213. User database 211 is a database for recording user configuration information used for each of plural user IDs of the posted information sharing system. The user configuration information includes configuration information unique to a user; for example, a list of identifications of communities to which the user belongs, a condition for restricting the posted information shared in a community, or a list of user IDs showing other users, who are friends of the user. The condition includes, for example, a condition of restriction by time (for example, sharing posted information that was posted within the previous week), a condition of restriction by a user (for example, sharing only posted information that was posted by friends), or a condition of no restriction (sharing all the posted information posted within the previous week).

Posted information database 212 is a database for recording plural items of posted information. Each item of plural posted information corresponds to an application program from among the plural application programs. In other words, each item of the plural posted information is stored with information showing a relationship with the application program.

Community database 213 is a database for recording information (attribute information) relating to each of the plural communities. Each of the plural communities corresponds to at least one application program. In other words, community database 213 is a database for recording, for each of the plural application programs, information relating to the at least one community corresponding to the application program. Transmitting unit 22 transmits posted information read from posted information database 212, in response to a request from information-processing device 10.

In this example, post server 20 further includes identification receiving unit 23, determining unit 24, inquiring unit 25, response receiving unit 26, and community registering unit 27. Identification receiving unit 23 receives program identification information of the application being executed (the identification information is referred to as "executed-program identification information"). Determining unit 24 determines whether a community (or a bulletin board system) corresponding to the application program identified by the program identification information received by identification receiving unit 23, is registered in community database 213. If it is determined that a corresponding community (or bulletin board system) is not registered, inquiring unit 25 transmits to another device (shop server 30, for example) an inquiry relating to an application program identified by the executed-program identification information. Response receiving unit 26 receives a response for the inquiry transmitted by inquiring unit 25. In this example, the response includes attribute information of the application program identified by the executed-program identification information. Community registering unit 27 newly registers in community database 213 information relating to a community corresponding to the application program identified by the executed-program identification information, based on a response received by response receiving unit 26.

In this example, identification receiving unit 23 receives from information-processing device 10, in addition to the executed-program identification information, posted information relating to the executed-program identification information. Inquiring unit 25 transmits to shop server 30 an inquiry if a community corresponding to the application program identified by the executed-program identification information is not registered in community database 213.

Further, in this example, post server 20 includes data generating unit 28. Identification receiving unit 23 receives a request for access including community identification information for identifying a community. A response received by response receiving unit 26 includes location information indicating a location of a web page for purchasing the corresponding application program (hereinafter, referred to as a "subject application program"). Data generating unit 28 generates data showing a web page including location information corresponding to the subject application program, and corresponding to a community identified by the community identification information received by identification receiving unit 23, with reference to information registered in community database 213. Transmitting unit 22 transmits the data generated by data generating unit 28, to information-processing device 10, a source of the posted information.

Further, in this example, post server 20 includes request receiving unit 202, posted information extracting unit 203, and posted information transmitting unit 204. Request receiving unit 202 receives from information-processing device 10 a request for browsing posted information. Posted information extracting unit 203 extracts items of posted information that satisfies a condition for restricting posted information applicable to the request, from among plural items of posted information registered in posted information database 212. Posted information transmitting unit 204 transmits the data generated by using the items of posted information extracted by posted information extracting unit 203, to information-processing device 10, the source of the request.

Post server 20 is a computer device including a CPU and a memory as hardware elements. The CPU is a device that controls elements of post server 20, and executes various calculations. The memory is a device that stores data and programs, and includes a RAM and a ROM, for example. In this case, the memory stores a posted server program causing a computer device to function as post server 20. By execution of the posted server program by the CPU, functions shown in FIG. 7 are implemented.

2-4. Shop Server 30

Figure 8:
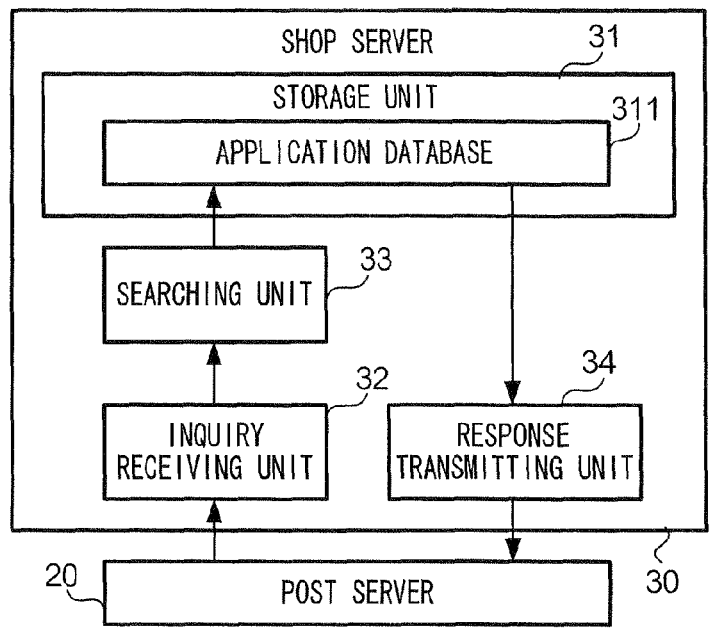
FIG. 8 shows an example of functional configuration of shop server 30.

FIG. 8 shows an example of a functional configuration of shop server 30. Shop server 30 includes storage unit 31, inquiry receiving unit 32, searching unit 33, and response transmitting unit 34. Storage unit 31 stores application database 311. Application database 311 is a database in which program identification information and attribute information of the application program identified by the program identification information are registered for each of plural application programs. Further, in application database 311, entity files of software are registered for at least a part of the application programs, for purchase or distribution via download. Inquiry receiving unit 32 receives an inquiry from post server 20. Searching unit 33 searches items of attribute information of the application program relating to the inquiry, from among plural items of information registered in application database 311. Response transmitting unit 34 transmits the search result(s) by searching unit 33 as a response to the inquiry received by inquiry receiving unit 32, to post server 20, the source of the inquiry. Further, shop server 30 has a function to purchase or distribute an application program via download, in response to a request from information-processing device 10.

Shop server 30 is a computer device including a CPU and a memory as hardware elements. The CPU is a device that controls elements of shop server 30, and executes various calculations. The memory is a device that stores data and programs, and includes a RAM and a ROM, for example. In this case, the memory stores a shop server program causing a computer device to function as shop server 30. By execution of the shop server program by the CPU, functions shown in FIG. 8 are implemented.

3. Operation

Operations of information-processing device 10 will now be described. Here, an example in which a community corresponding to game application 53 is accessed during execution of game application 53 in information-processing device 10, is described. In other words, an example in which a user playing game application 53 accesses a community corresponding to game application 53 being played currently, is described. In the following, a method for accessing post server 20 is described. Then, a process in posted information sharing system 1 (in other words, what can be done in posted information sharing system 1) is described.

3-1. Methods for Accessing Post Server

Figure 9:
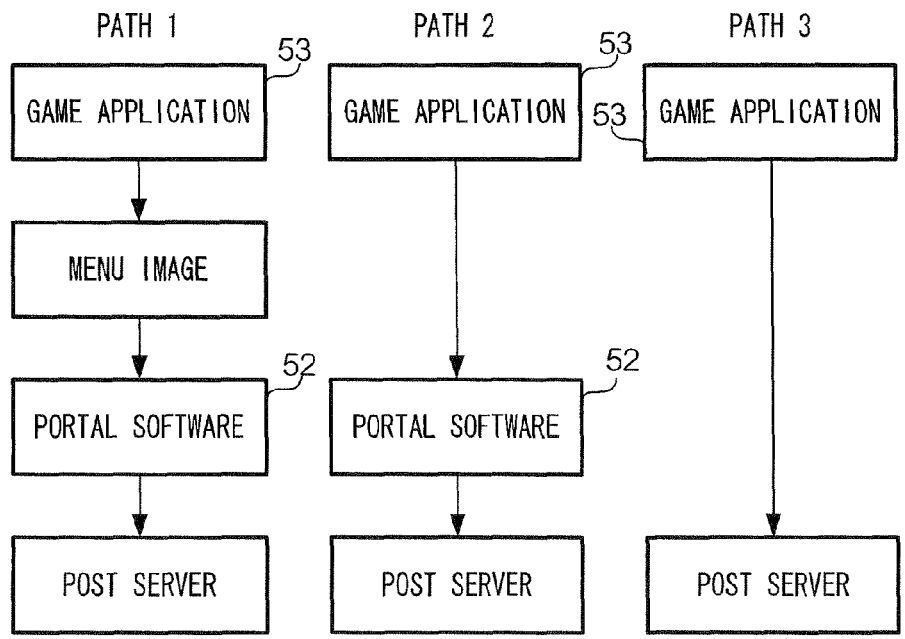
FIG. 9 shows examples of methods for accessing post server 20.

FIG. 9 shows examples of methods for accessing post server 20. The methods for accessing post server 20 are divided into two categories. The first category is to access post server 20 via portal software 52, as shown as paths 1 and 2 in FIG. 9. The second category is to access post server 20 directly from game application 53, as shown as path 3 in FIG. 9. The first category includes two methods. According to the first method, (i) the execution of game application 53 is temporally paused, (ii) a function (for example, a menu image) of system software 51 is called, and (iii) portal software 52 is called via the menu image. The first method is also referred to as path 1. According to the second method, portal software 52 is called directly from game application 53. The second method is also referred to as path 2. Details of these methods will be described below.

3-1-1. Access Via Portal Software 52

3-1-1-1. (Path 1) Call Via Menu Image

In this example, OS 511 temporally pauses the execution of game application 53 when a predetermined command is input (for example, a predetermined button from among plural buttons of input module 104 is pushed) when game application 53 is being executed. Then, OS 511 calls a menu image. The menu image is provided by a function of system software 51. The menu image includes an item for instructing portal software 52 to start. If a user selects the item, OS 511 starts portal software 52. The user accesses post server 20 via portal software 52. In this example, after the menu image is called and during the access to post server 20, game application 53 that was being executed is temporarily paused. If a predetermined command is input while game application 53 is paused, OS 511 resumes game application 53.

Figure 10:
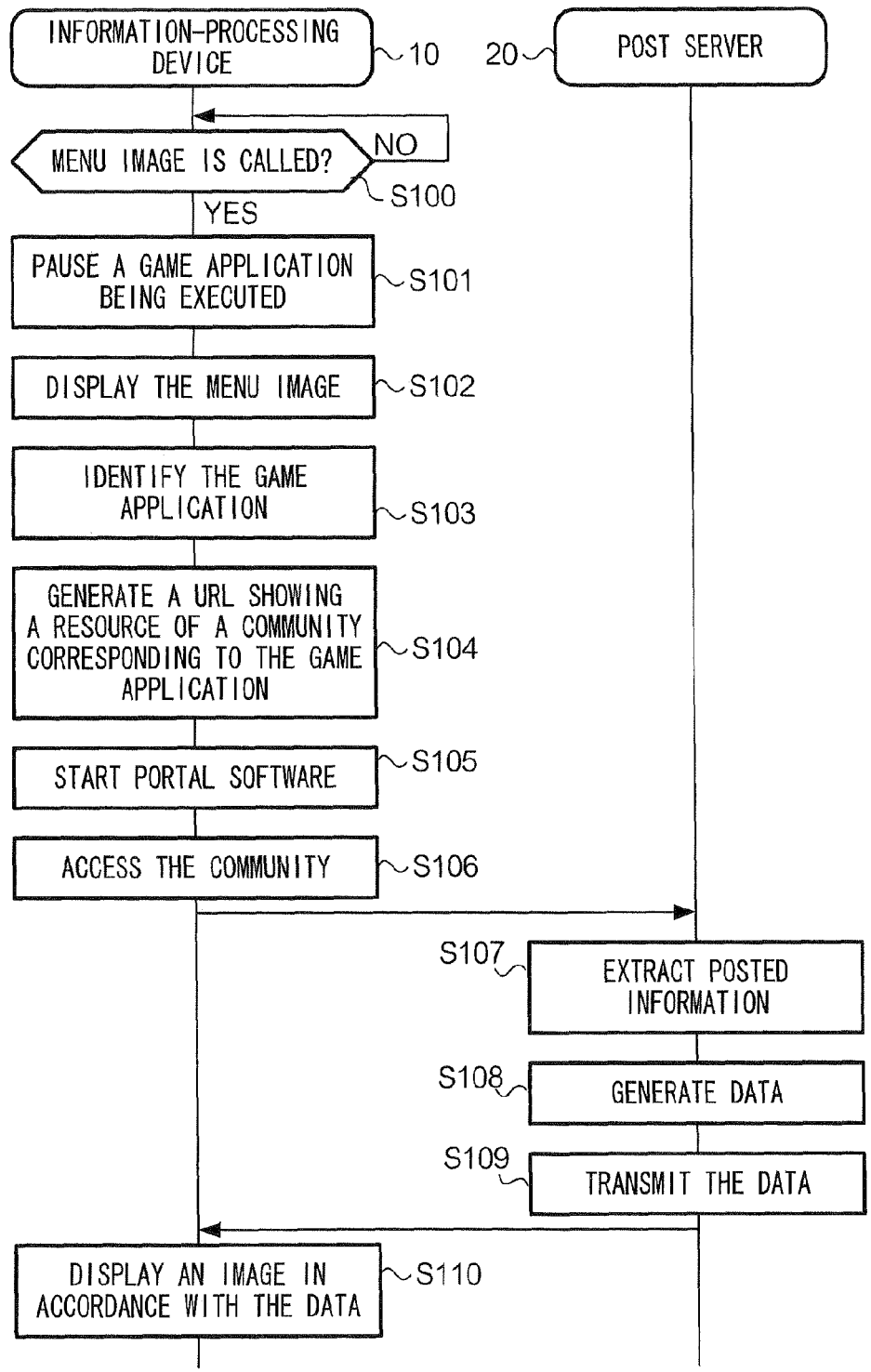
FIG. 10 shows an example of a sequence chart illustrating an operation of information-processing device 10.

FIG. 10 shows an example of a sequence chart illustrating an operation of information-processing device 10. In the following descriptions, a program such as OS 511 or portal software 52 is described as a subject of the process. These descriptions mean that CPU 101 executing the program cooperates with other hardware devices to execute the process.

In step S100, OS 511 determines whether the menu image is called during the execution of game application 53. In this example, OS 511 monitors input module 104. If a predetermined command is input via input module 104, OS 511 determines whether the menu image is called. If it is determined that the menu image is called (step S100: YES), OS 511 transfers the operation to step S101. If it is determined that the menu image is not called (step S100: NO), OS 511 continues to execute game application 53.

In step S101, OS 511 pauses game application 53 that is being executed. In other words, OS 511 activates another program, with data used for game application 53 being stored in memory 102.

In step S102, OS 511 displays the menu image. The menu image includes an item for instructing portal software 52 to start. If the user selects the item, OS 511 transfers the operation to step S103.

In step S103, application identifying module 512 identifies an application program (an application program being executed, in this example, game application 53) that was being executed at the time of input of the instruction to call the menu image. Details are as follows. OS 511 reads from memory 102 the application ID of the application program being executed. Then, OS 511 calls application identifying module 512. When calling application identifying module 512, OS 511 notifies application identifying module 512 of the read application ID. It is to be noted that the application ID of the application program being executed is stored in memory 102, according to a process independent from the flow shown in FIG. 10. More specifically, when starting an application program, OS 511 obtains the application ID from the application program. OS 511 continues to store the application ID in memory 102 from the start to the termination of the application program.

In step S104, identification generating module 513 generates a URL (an example of community identification information) showing a resource of the corresponding community, using the application program identified by application identifying module 512. Identification generating module 513 includes a table, a function, or a rule for exchanging an application ID for a URL. Identification generating module 513 generates the URL from the application ID with reference to the table, the function, or the rule.

In step S105, OS 511 starts portal software 52. When starting portal software 52, OS 511 notifies portal software 52 of the URL generated by identification generating module 513 as a URL showing a resource that is accessed when the portal software 52 is started.

In step S106, portal software 52 accesses the community shown by the notified URL. In other words, portal software 52 accesses, via access module 514, a resource (in this example, a directory selected from among plural directories of post server 20, in response to the application being executed) corresponding to an application program that was being executed at the time when portal software 52 is instructed to start.

When accessing post server 20, access module 514 transmits to post server 20 a request including the application ID and a user ID of the user of information-processing device 10. The user ID is an example of identification information of a user who is logged in to information-processing device 10 (in other words, a user who uses information-processing device 10). The user ID is identified at a predetermined timing, for example, at the time of booting information-processing device 10, by a so-called login process.

FIG. 11 shows an example of data stored in posted information database 212. Posted information database 212 includes plural data sets. Each data set includes a post ID, a time stamp, an application ID, a user ID, a text (posted text), a set of binary data, and a tag. The post ID is identification information for identifying the posted information. The post ID is allocated by post server 20 according to a predetermined rule (for example, the post ID is allocated in order of receipt of the posted information). The time stamp shows the time when the posted information is received (or when the posted information is posted). The application ID is identification information for identifying an application program corresponding to the posted information, more specifically, an application program (the application program being executed) that was being executed in information-processing device 10 when an instruction to post the subject posted information was made. The user ID is identification information of a user who posts the subject posted information. The posted text consists of character strings input by the user. It is to be noted that handwritten characters (or image) or a text automatically generated by the system may be used instead of or as well as the posted text. The set of binary data is a data set used in the application program identified by the corresponding application ID. More specifically, the set of binary data is a data set generated by the subject application program. The tag is data showing other related information. In this example, the tag includes usage information showing the usage status. The usage information shows information that cumulatively changes depending on the usage of the application program, for example, accumulated playing time of a game, or information that discontinuously changes depending on the usage of the application program; for example, a name of a save point in a game. It is to be noted that FIG. 11 merely shows an example, and information included in the posted information is not restricted to the example. A part of information shown in FIG. 11 may be omitted, and/or other information may be added to the example.

It is to be noted that progress information or information showing the usage status of the application program may be used instead of (or as well as) the usage information. The progress information shows the progress status of the application program. The usage information, the progress information, and the information showing the usage status are not restricted to the examples described above, the accumulated playing time and the name of the latest save point. In a case that the application program is a game application, the usage information, the progress information, and the information showing the usage status may be, for example, at least one of a number of times that the user clears the game, a number of times that the user plays the game, a number of times that the user defeats a character in the game, a type of a character in the game, a type of an event that occurs in the game, a number of wins (or losses) in the game, a number of items obtained in the game, the number of the latest stage cleared by the user, a name of the latest save point, a level of a character in the game, or an achievement (a degree of completion of tasks provided in the game).

In another example, in a case that the application program is a movie player, the status information may be a number of times that a movie is played, accumulated time of playing a movie, or a number of times an instruction to play a movie is made. In yet another example, in a case that the application program is a still image viewer, the usage information, the progress information, and the information showing the usage status may be a number of viewed pages, a type of viewed image, or a number of times an instruction to view an image is made.

Referring to FIG. 10 again, when post server 20 receives a request from information-processing device 10, post server 20 extracts (in step S107) at least a part of the posted information from the posted information recorded in posted information database 212, with reference to the user configuration information. More specifically, in a case that the application ID included in the request for access is "AAA001," post information having the post ID "351245," "351243," "351242," and "351241" is extracted in the example of FIG. 11. Further, at least a part of posted information that satisfies the condition for restricting the posted information is extracted from the extracted posted information. For example, in a case that the condition for restricting the posted information is "the newest posted information of each user" and "maximum total sum of the posted information is three," the posted information having the post ID "351245," "351243," and "351241" is extracted.

Post server 20 lists the extracted posted information (a group of the posted information) in an order according to a predetermined rule; for example, in an order of time stamps. Post server 20 generates (in step S108) data describing the extracted posted information in a predetermined format, for example, in HTML (HyperText Markup Language). Here, the generated data includes a community ID, identifying a community to which access is requested. The community ID is, for example, a part of the URL of the community. Post server 20 transmits (in step S109) the generated data to information-processing device 10 that is a source of the request for access.

In step S110, portal software 52 displays an image in accordance with the data received from post server 20. By the example of step S107, an image shown in FIGS. 2 and 3 is displayed. It is to be noted that the image to show the posted information is not restricted to the example shown in FIG. 3. In the example shown in FIG. 3, the usage information of "53 h" is displayed as it is. In another example, portal software 52 may change the image of at least one item included in the posted information in response to the usage information. More specifically, a shape, a color, or a size of the at least one item may be changed in response to the usage information. As a more detailed example, portal software 52 displays user ID 942 using a different color in a case that the posted information has the usage information (or the posted information is posted by a user who has played the game) from that used in a case that the posted information does not have the usage information (or the posted information is posted by a user who has not played the game). Alternatively, portal software 52 may display an image (an icon or a mark, for example) showing existence/non-existence of the usage information.

According to the flow shown in FIG. 10, a process for accessing post server 20 and a process for providing the UI are executed by the system software 51 or portal software 52. In other words, if the user application program does not have a function to access post server 20, a user can easily access a community relating to the user application program. For example, a user playing a game can share with other users his/her positive or negative experiences, for example, obtaining a rare item, clearing a stage, or encountering a dead end in the game. In addition, for a developer of an application program, cost for implementing functions to access post server 20 and to provide the UI can be decreased.

In the above description, an example in which portal software 52 is started from the user application program via the menu image is described. However, portal software 52 may be started other than via the menu image. In such a case, OS 511 starts portal software 52 when a predetermined command is input during the execution of game application 53. In another example, when game application 53 is being executed when the menu image is called, game application 53 may be terminated instead of be paused. In another example, a device ID (identification information of information-processing device 10) may be used instead of the user ID.

3-1-1-2. (Path 2) Call from Game Application 53

In this example, an application program has a UI to start portal software 52. For example, an image of the game includes a button to start portal software 52. If the button is pushed (clicked) by a user, portal software 52 is started. The details of the process are similar to those of path 1.

According to the example, a user can start portal software 52 without inputting a command via the menu image provided by a program other than the game. The user can start portal software 52 by inputting a command via a UI provided by the game.

3-1-2. (Path 3) Access from Game Application 53

In this example, an application program has a UI to access post server 20; in other words, the application program has a client function of the posted information sharing system 1. For example, an image of the game includes a button to access post server 20. If the button is pushed (clicked) by a user, the game application accesses post server 20. In path 3, the application program has a function different from examples of path 1 and path 2. Therefore, a software configuration is first described.

Figure 12:
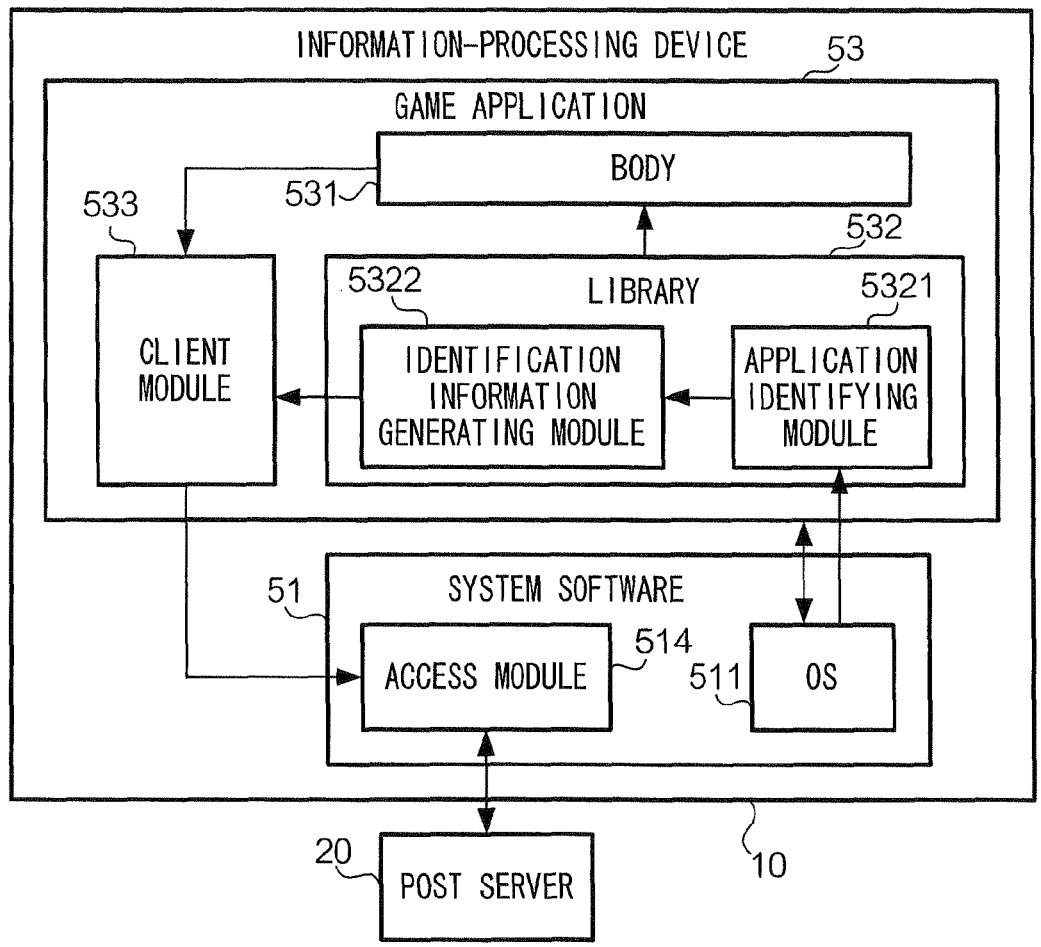
FIG. 12 shows an example of a software configuration relating to path 3.

FIG. 12 shows an example of a software configuration relating to path 3. In this example, game application 53 includes body 531 of the game program, library 532, and client module 533. Client module 533 is a client software module of the posted information sharing system 1, for accessing post server 20 via access module 514. library 532 is a software module used in body 531, and includes, for example, application identifying module 5321 and identification information generating module 5322. Application identifying module 5321 identifies an application program that is being executed. More specifically, application identifying module 5321 obtains an application ID of the executed application program. Identification information generating module 5322 generates identification information (a URL, for example) of a community relating to the application program being executed. Library 532 is provided by the provider of the platform of information-processing device 10 (the provider of the game device, for example) for software developers. It is to be noted that application identifying module 512 and identification generating module 513 are not shown in FIG. 12 because these functions are not used in this example.

In the example shown in FIG. 12, application identifying module 5321 is an example of application identifying unit 14, and identification information generating module 5322 is an example of generating unit 18.

If an instruction to access posted information sharing system 1 is made during the execution of game application 53, body 531 of the game program calls application identifying module 5321. When calling application identifying module 5321, body 531 notifies application identifying module 5321 of the application ID of the game program. Then, application identifying module 5321 calls identification information generating module 5322. Identification information generating module 5322 generates a URL showing a resource of the corresponding community based on the application ID identified by application identifying module 5321. Identification information generating module 5322 includes a table, a function, or a rule to change an application ID into a URL. Identification information generating module 5322 generates a URL from the application ID with reference to the table, the function, or the rule.

Identification information generating module 5322 notifies body 531, which is a source of the call, of the generated URL. Then, body 531 of the game program calls client module 533. When calling client module 533, body 531 of the game program notifies client module 533 of the URL of the community. Client module 533 accesses post server 20 by using the notified URL.

According to the example, a user can access post server 20 without inputting a command via the menu image provided by a program other than the game. Further, since a software developer can implement a client function into the application program, a UI synchronized with the image of the game can be provided.

3-2. Process in Posted Information Sharing System

Next, description will be given for a process in the posted information sharing system 1 (how a user can use the posted information sharing system 1). The process in the posted information sharing system 1 includes browsing the posted information, posting the posted information, and managing the community.

3-2-1. Browsing

Browsing is a process for browsing the posted information. Information stored in post server 20 includes, for example, the posted information and direct messages. The posted information is shared by plural users. The direct message can be viewed by a single specified user. In the following descriptions, viewing this information using portal software 52 will be described.

3-2-1-1. Browsing Posted Information Relating to Community

Figure 13:
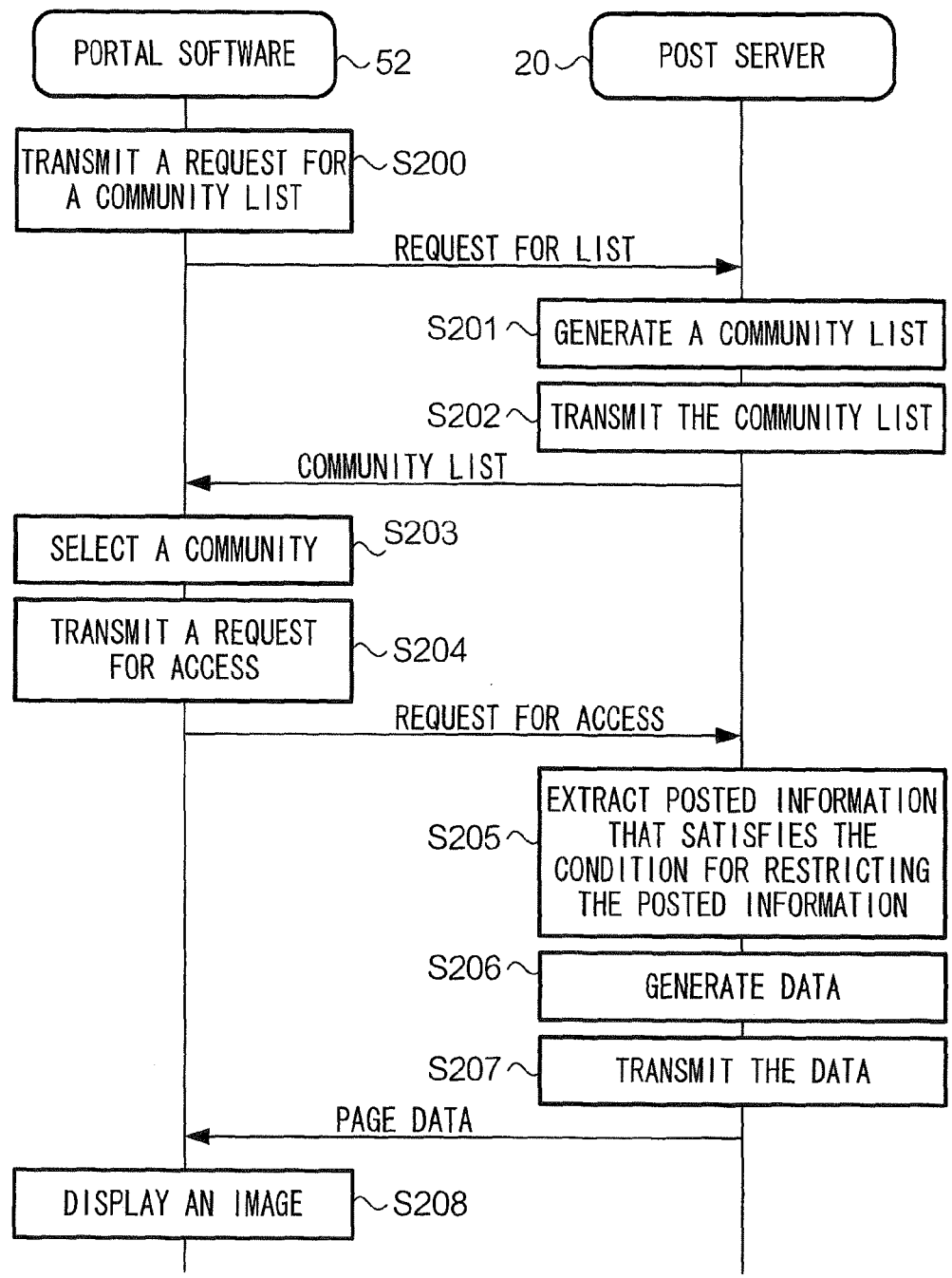
FIG. 13 shows an example of a sequence chart illustrating a process for browsing the posted information relating to a community.

FIG. 13 shows an example of a sequence chart illustrating a process for browsing the posted information relating to a community. In step S200, portal software 52 transmits to post server 20 via access module 514 a request for transmitting a list of communities. The request includes the user ID of a user of information-processing device 10. When post server 20 receives the request from information-processing device 10, post server 20 extracts from community database 213 information showing communities to which the user having the user ID included in the request belongs. Post server 20 generates (in step S201) a list of the extracted communities (hereinafter referred to as a "community list").

FIG. 14 shows an example of the community list. The community list includes a community ID, a title, an application ID, and attribute information. The community ID is identification information for identifying a community (hereinafter, a specific community that is an object of the description will be referred to as a "subject community"). The community ID is automatically allocated by the system (more specifically, by post server 20). The title is identification information for identifying the subject community, and is input by a user who generates the subject community. The application ID is identification information for identifying an application program corresponding to the subject community. The attribute information shows an attribute of the subject community. In this example, the attribute information includes, for example, the user who generates the subject community, a number of members who belong to the subject community, and a URL of the subject community. The user who generates the subject community is identified by the user ID. In this example, the community is divided into two categories, an official category and a user category. The official community is a community that is generated by a provider of posted information sharing system 1 or a provider of the application program. For the official community, the user is recorded as "official." The user community is a community that is generated by a user. The number of members shows a number of users who belong to the subject community. The URL shows a resource providing the subject community. It is to be noted that the attribute information may include other information, for example, a required condition to join the subject community.

Referring to FIG. 13 again, post server 20 transmits (in step S202) the generated community list to information-processing device 10 that is the source of the request. When portal software 52 receives the community list, portal software 52 displays an image for prompting a user to select a community. The user selects (in step S203) a community to be browsed via the image. After a community is selected, portal software 52 transmits (in step S204) a request for accessing post server 20 via access module 514. The request includes the user ID of the user of information-processing device 10, and the community ID of the selected community.

When post server 20 receives the request from information-processing device 10, post server 20 extracts (in step S205) posted information that satisfies the condition for restricting the posted information, from the posted information recorded in posted information database 212. Post server 20 generates (in step S206) data describing the extracted posted information in a predetermined format. Post server 20 transmits (in step S207) the generated data to information-processing device 10 that is the source of the request. Portal software 52 receives the data via access module 514. Portal software 52 displays (in step S208) an image in accordance with the data received from post server 20. Details of steps S205 to S208 are similar to those in steps S107 to S110.

3-2-1-2. Viewing Direct Messages

Figure 15:
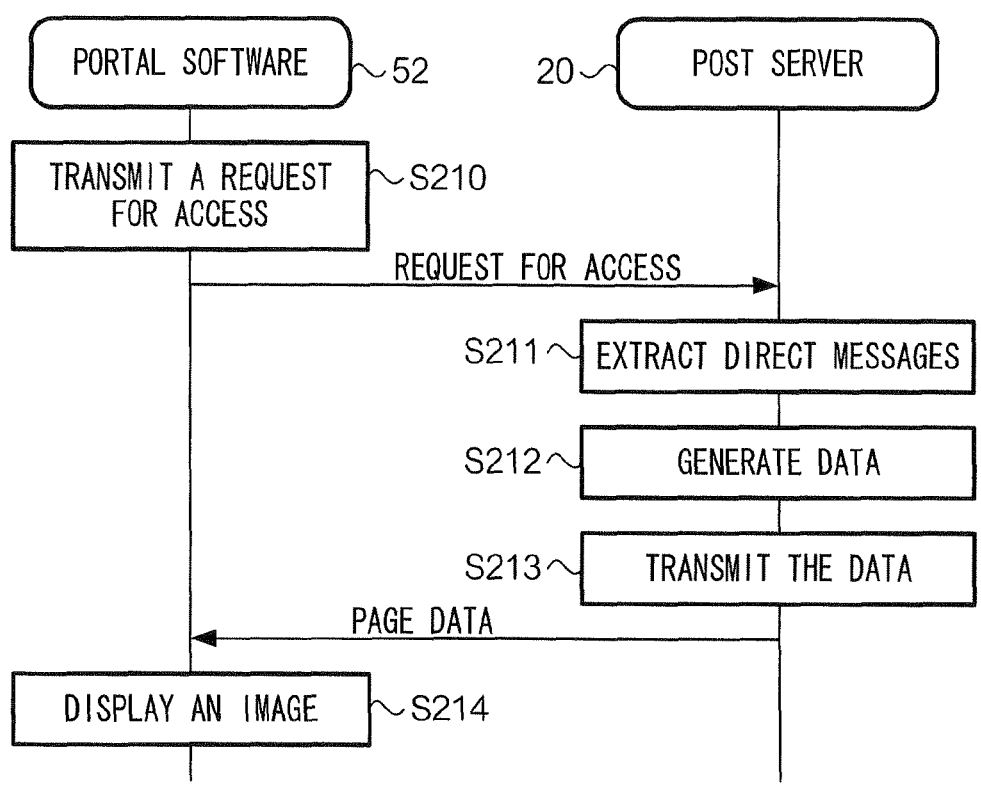
FIG. 15 shows an example of a sequence chart illustrating a process for viewing a direct message.

FIG. 15 shows an example of a sequence chart illustrating a process for viewing a direct message. In step S210, portal software 52 transmits to post server 20 via access module 514 a request for accessing a direct message. The request includes a user ID.

When post server 20 receives the request from information-processing device 10, post server 20 extracts (in step S211) direct messages that satisfy the condition for restricting the posted information, from among the direct messages recorded in posted information database 212. It is to be noted that the condition for restricting the posted information includes a condition relating to the direct message. Post server 20 generates (in step S212) data describing the extracted direct message in a predetermined format. Post server 20 transmits (in step S213) the generated data to information-processing device 10 that is the source of the request. Portal software 52 displays (in step S214) an image in accordance with the data received from post server 20. Details of steps S211 to S214 are similar to those in steps S107 to S110.

3-2-2. Posting

The posting is a process for sharing information with other users. As described in relation to the browsing, information recorded in post server 20 includes the posted information and the direct message. In this example, a set of binary data can be attached to the posted information. Here, description will be given for examples with and without the set of binary data. Furthermore, description will be given for posting a direct message.

3-2-2-1. Posting Texts

Figure 16:
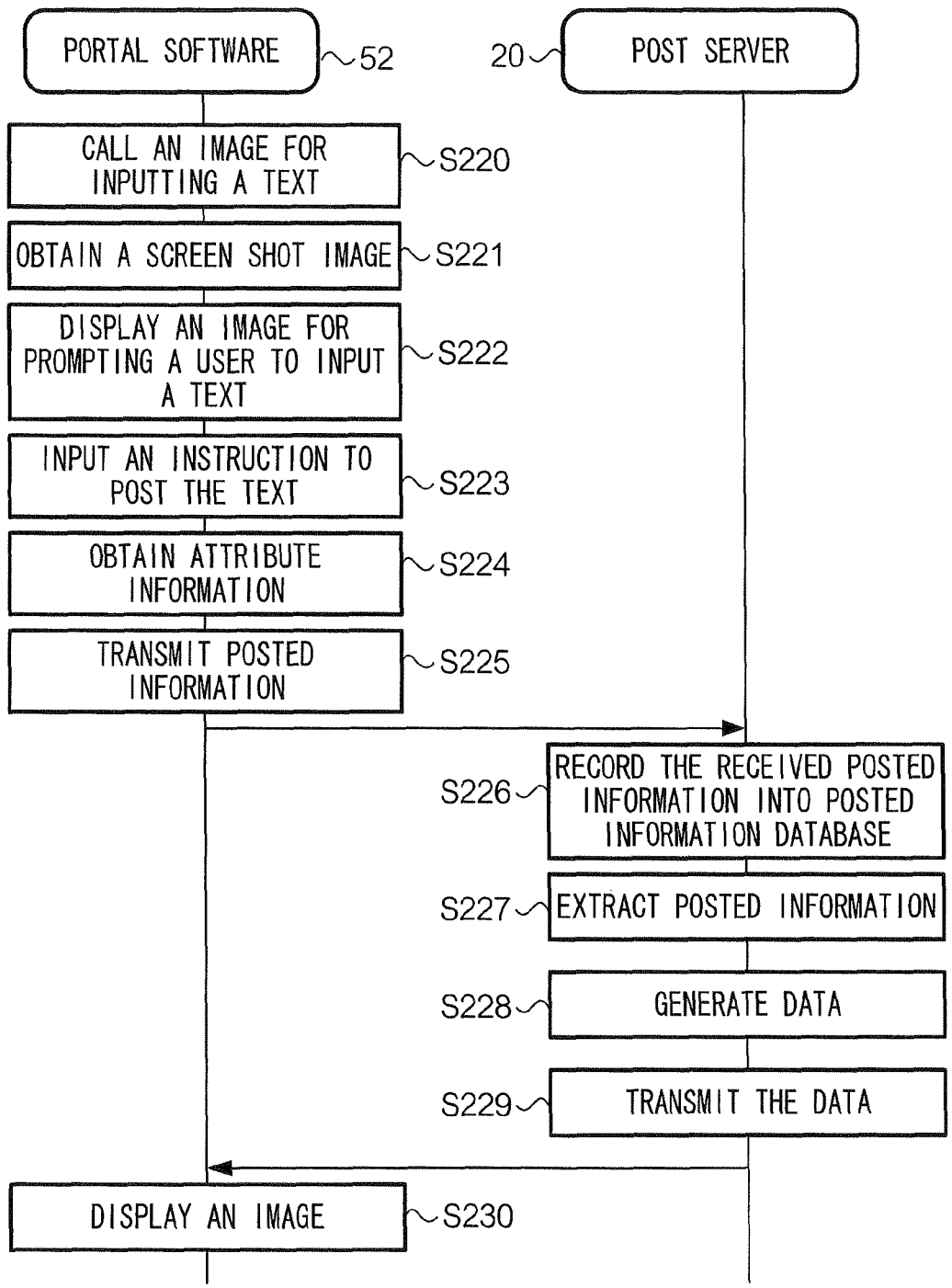
FIG. 16 shows an example of a sequence chart illustrating a process for posting text.

FIG. 16 shows an example of a sequence chart illustrating a process for posting a text. Here, description will be given for an example in which portal software 52 is called during the execution of game application 53, and a text is posted via portal software 52. In step S220, portal software 52 calls an image for inputting a text. The call is triggered by a predetermined event, for example, an instruction to start portal software 52 is input.

In step S221, portal software 52 obtains a screen shot image of the application program being executed. The application program "being executed" is an application program that was being executed at the time when the instruction to start portal software 52 was made, and, in this example, game application 53 is the application program being executed. While portal software 52 is activated, game application 53 is temporarily paused. As has already been described, while game application 53 is paused, data used for game application 53 is expanded in memory 102. Portal software 52 generates a screen shot image based on the data of game application 53 expanded in memory 102.

In step S222, portal software 52 displays an image for prompting a user to input a text to post. The image is shown in FIG. 2, for example. The user inputs a text to be posted, via the image. After completing the input of the text to be posted, the user inputs (in step S223) an instruction to post the text, by clicking post button 93, for example.

In step S224, portal software 52 obtains attribute information used for the posted information. In this example, the attribute information includes a time stamp, a user ID, an application ID, a community ID, and usage information. The time stamp shows the current time. The application ID is identification information of the application program that is paused. The usage information is the usage information of the application program that is paused. In this example, the usage information shows accumulated playing time of the game. The time stamp, the user ID, the application ID, and the usage information are held by OS 511. Portal software 52 obtains from OS 511 the time stamp, the user ID, the application ID, and the usage information. The community ID is identification information of a community that portal software 52 is accessing. The community ID is held by portal software 52.

For example, in a case that an accumulated playing-time of the game is used as the usage information, OS 511 keeps the accumulated playing-time by a process independent from the process shown in FIG. 16 Memory 102 stores the usage information of application programs that have been played in the subject information-processing device 10 as well as a corresponding application ID with the relationship thereof. For example, in a case that ten game applications have been played in the subject information-processing device 10, ten sets of application ID and accumulated playing-time are stored in memory 102. When an application program is started, OS 511 measures by a timer (not shown in the figures) a time during which the application program is executed. At a predetermined timing (for example, periodically, or when the application program is terminated), OS 511 adds the measured time to an accumulated playing-time of the subject application program, from among the plural accumulated playing-times stored in memory 102. It is to be noted that the accumulated playing time may be recorded for each user.

Referring to FIG. 16 again, in step S225, portal software 52 transmits the posted information to post server 20 via access module 514. The subject posted information includes the screen shot image obtained in step S221 and the attribute information obtained in step S224.

In step S226, post server 20 records the received posted information into posted information database 212. Post server 20 extracts (in step S227) posted information that satisfies the condition for restricting the posted information from posted information database 212. Post server 20 generates (in step S228) data showing the extracted posted information in a predetermined format. Post server 20 transmits (in step S229) the generated data to information-processing device 10 that is the source of the request. Portal software 52 displays (in step S230) an image in accordance with the data received from post server 20. Details of steps S227 to S230 are similar to those of steps S107 to S110.

3-2-2-2. Posting Binary Data

Figure 17:
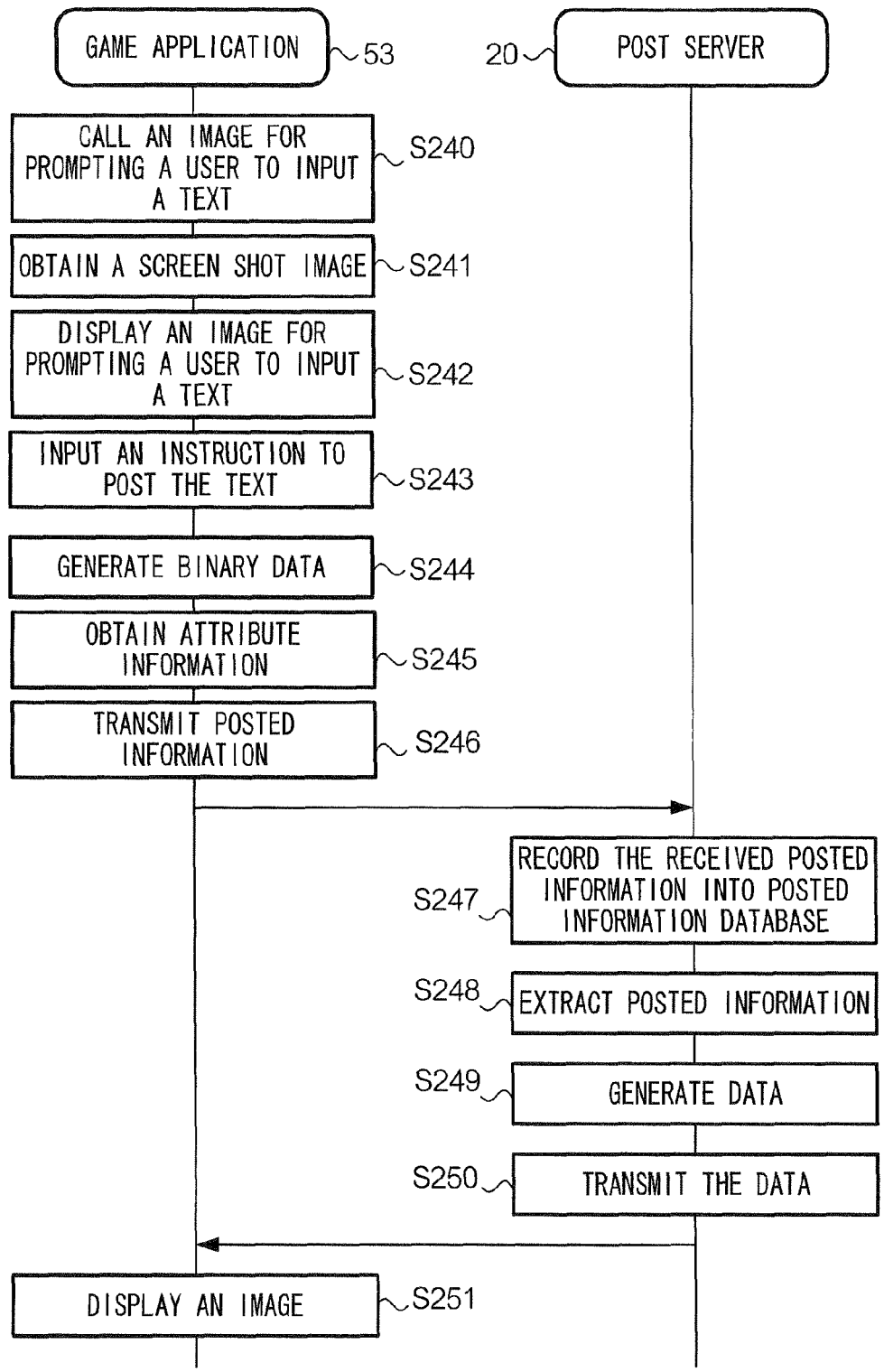
FIG. 17 shows an example of a sequence chart illustrating a process for posting information including a set of binary data.

FIG. 17 shows an example of a sequence chart illustrating a process for posting information including a set of binary data. Here, description will be given for an example in which game application 53 transmits a posted text and a corresponding set of binary data. In step S240, game application 53 calls an image for prompting a user to input a text. The call of the image is triggered by a predetermined event, for example, a predetermined command is input during the execution of the game.

In step S241, game application 53 obtains a screen shot image of the application program being executed. In step S242, game application 53 displays the image for prompting a user to input a text. After completing an input of a text, the user instructs (in step S243) to post the text. Details of steps S241 to S243 are similar to those in steps S221 to S223.

In this example, the image for prompting a user to input a text provides a UI to select a set of binary data to be attached to the posted text. For example, in a case that binary data shows an item used in the game, the image provides a UI to select an item from among items obtained in the game by the user, to be shared in the community. In step S244, game application 53 generates a set of binary data showing an item selected via the UI.

In step S245, game application 53 obtains attribute information used for the posted information. In step S246, game application 53 transmits the posted information to post server 20. The subject posted information includes a set of binary data generated in step S244, and the attribute information generated in step S245.

In step S247, post server 20 records the received posted information into posted information database 212. Post server 20 extracts (in step S248) posted information that satisfies the condition for restricting the posted information from posted information database 212. Post server 20 generates (in step S249) data showing the extracted posted information in a predetermined format. Post server 20 transmits (in step S250) the generated data to information-processing device 10 that is the source of the request. Portal software 52 displays (in step S251) an image in accordance with the data received from post server 20. Details of steps S247 to S251 are similar to those of steps S226 to S230.

3-2-2-3. Posting Direct Message

Figure 18:
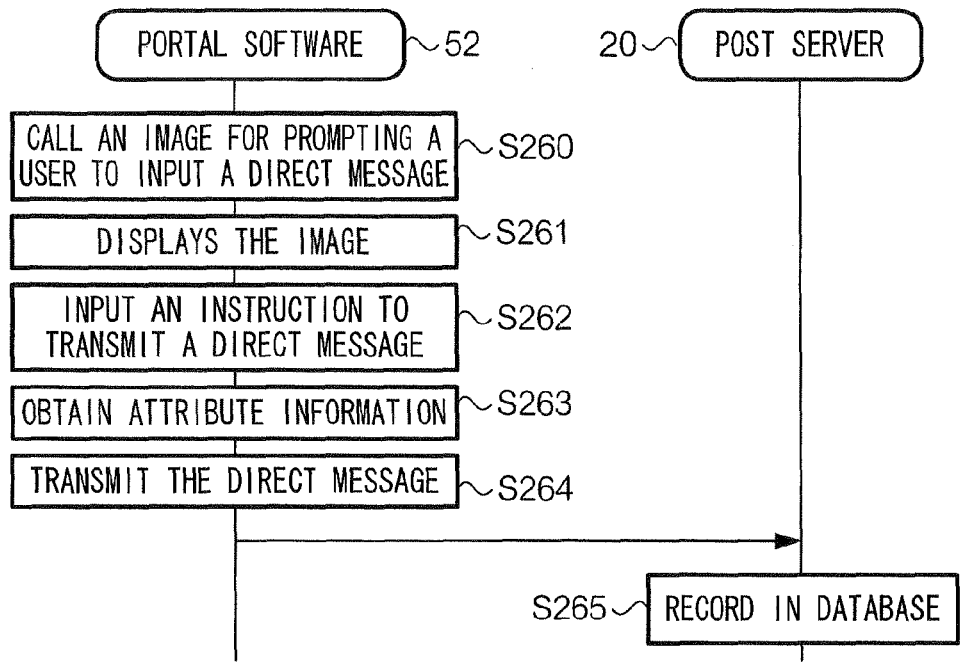
FIG. 18 shows an example of a sequence chart illustrating a process for posting a direct message.

FIG. 18 shows an example of a sequence chart illustrating a process for posting a direct message. Here, description will be given for an example in which portal software 52 posts a direct message. In step S260, portal software 52 calls an image for prompting a user to input a direct message. The calling of the image is triggered by a predetermined event, for example, a predetermined command is input via portal software 52.

In step S261, portal software 52 displays the image for prompting a user to input a direct message. The image includes a box for inputting an ID of a user to whom the direct message is sent, and another box for inputting a message. After completing the input of the message, the user instructs (in step S262) to transmit the direct message. In step S263, portal software 52 obtains attribute information used for the direct message. In this example, the user ID of the sender (source) and the user ID of the destination, are used as the attribute information. In step S264, portal software 52 transmits the direct message to post server 20 via access module 514. The direct message includes the attribute information obtained in step S263. In step S265, the direct message is recorded in posted information database 212.

3-2-3. Community Management

Community management includes participation in a community, withdrawal from a community, and generation of a new community.

3-2-3-1. Participation

Participation in a community is a process for participating in a community in which the user has not previously participated. Here, an example in which the user participates in a community via portal software 52 will be described.

Figure 19:
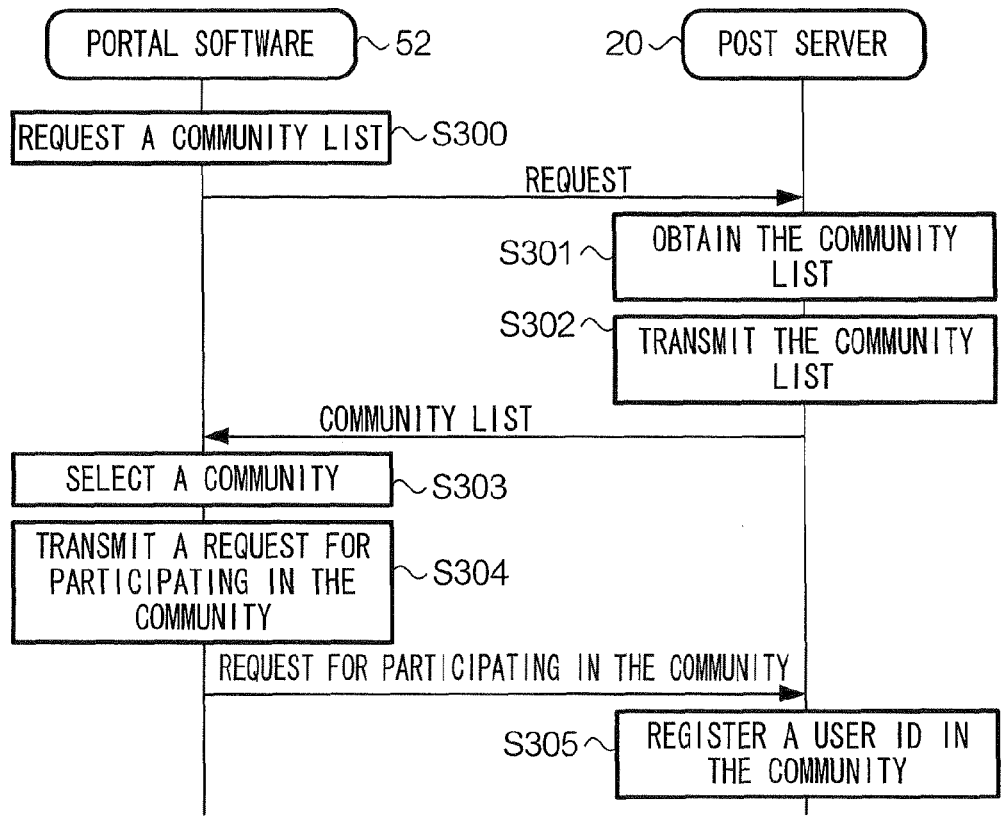
FIG. 19 shows an example of a sequence chart illustrating a process for participating in a community.

FIG. 19 shows an example of a sequence chart illustrating a process for participating in a community. In step S300, portal software 52 transmits to post server 20 a request for transmitting a list (hereinafter referred to as a "community list") of the communities.

If post server 20 receives a request for transmitting the community list from information-processing device 10, post server 20 obtains (in step S301) a community list from the community database. In step S302, post server 20 transmits the obtained community list to information-processing device 10, the source of the request.

If portal software 211 receives the community list, portal software 52 controls the display device to display an image for prompting the user to select a community. The user selects (in step S303) via the image a community in which the user wishes to participate. If a community is selected, portal software 52 transmits (in step S304) a request for participating in a community to post server 20. The request for participating in a community includes the community ID of the community and the user ID.

If post server 20 receives a request for participating in a community, post server 20 registers (in step S305) the user ID included in the request in the community identified by the community ID included in the request, in community database 213.

3-2-3-2. Withdrawal

Withdrawal from a community is a process for withdrawing from a community to which the user belongs. Here, an example in which the user withdraws from a community via portal software 52 will be described.

Figure 20:
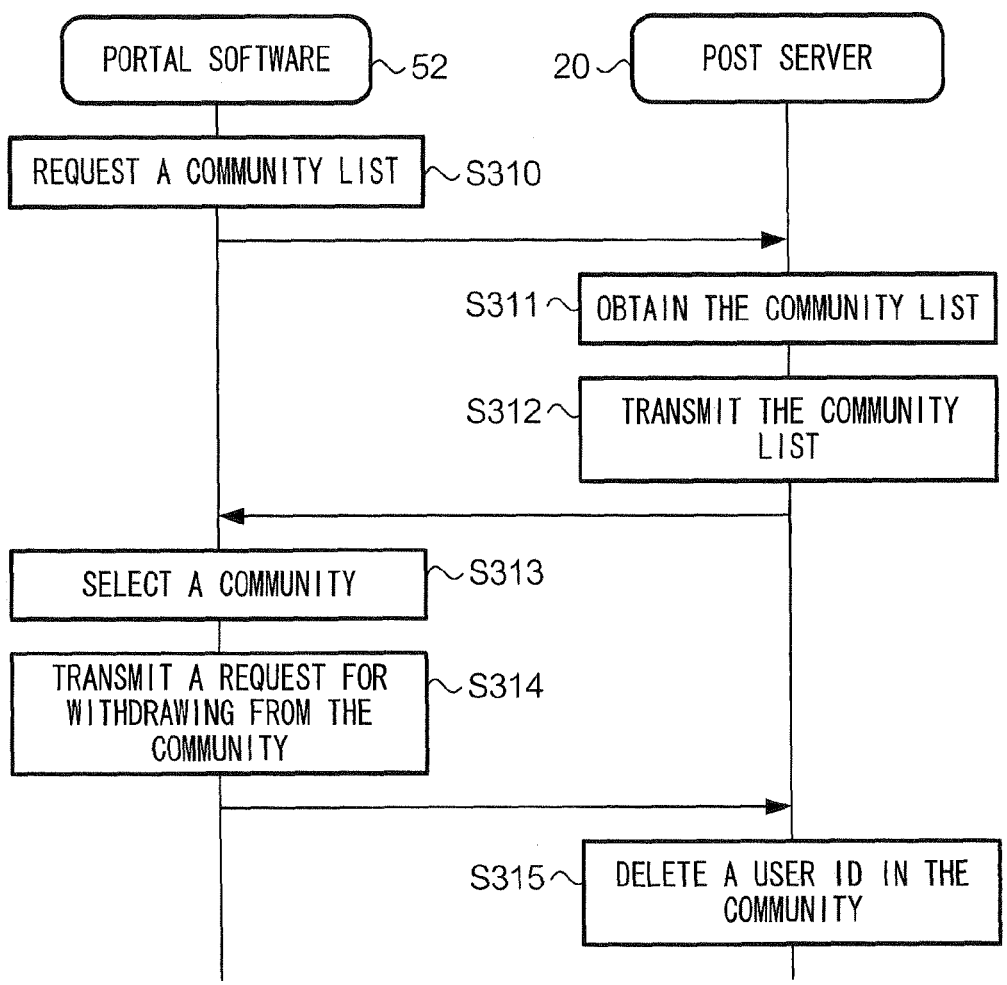
FIG. 20 shows an example of a sequence chart illustrating a process for withdrawing from a community.

FIG. 20 shows an example of a sequence chart illustrating a process for withdrawing from a community. In step S310, portal software 52 transmits a request for transmitting the community list to post server 20. The request includes a user ID of a user of information-processing device 10. If post server 20 receives a request for the community list from information-processing device 10, post server 20 obtains (in step S311) from the community list a list of communities to which the user identified by the user ID included in the request belongs.

Post server 20 transmits (in step S312) the obtained community list to information-processing device 10, the source of the request. If portal software 52 receives the community list, portal software 52 controls the display device to display an image for prompting a user to select a community. The user selects (in step S313) via the image a community from which the user wishes to withdraw. If a community is selected, portal software 52 transmits (in step S314) a request for withdrawing from the community to post server 20. The request includes the community ID of the selected community and the user ID.

If post server 20 receives a request for withdrawing a community, post server 20 deletes (in step S315) the user ID included in the request, from a community identified by the community ID included in the request, in community database 213.

3-2-3-3. Generation of a Community

Generation of a community is a process for generating a new community. Here, an example in which the user generates a new community via an image for generating a new community, and another example in which the user generates a new community by posting new posted information will be described.

3-2-3-3-1. Generating a New Community by Posting New Posted Information

In the above example, at least one community relating to an application program already exists. However, a problem arises when the service provider should generate a new community relating to a newly sold application program (hereinafter, referred to as a "subject community"). One potential solution is to prepare the subject community with closed access (or prohibited access). On a predetermined date (for example, the on-sale date), access to the subject community changes to public (or allowed) access. However, the actual date when a user obtains the newly on-sale application program is beyond control of the software vendor, depending on shipping conditions, for example. If access to the subject community is changed to public access too early, there may be no post before the on-sale date. If access to the subject community is made public too late, users cannot post information they may wish to post until access to the subject community is made public. On the contrary, according to this example, generation of a new community is triggered by posting information.

Figures 21, 22:
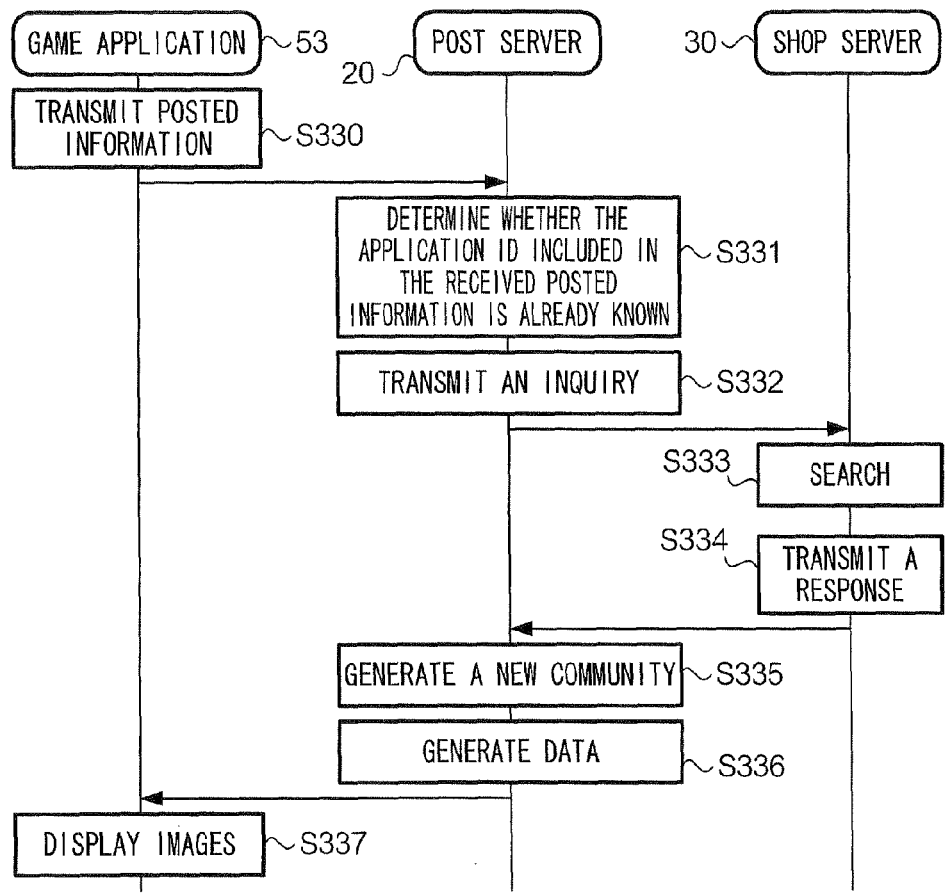
FIG. 21 shows an example of a sequence chart illustrating a process for generating a new community triggered by posting.
FIG. 22 shows an example of data registered in application database 311.

FIG. 21 shows an example of a sequence chart illustrating a process for generating a new community triggered by posting. In step S330, portal software 52 transmits posted information. As already described, the posted information includes the application ID of the application program being executed. In step S331, post server 20 determines whether the application ID included in the received posted information is already known. More specifically, post server 20 determines whether a community relating to the application ID is already registered in community database 213. If it is determined that the application ID is known (in step S331: YES), a process for handling the posted information, for example, steps S226 to S230, is executed. Here, a process in a case that the application ID is not known (in step S331: NO) will be described.

In step S332, post server 20 transmits an inquiry to shop server 30. The inquiry includes the unknown application ID.

If shop server 30 receives an inquiry from post server 20, shop server 30 searches (in step S333) for the application ID included in the received inquiry, in application database 311. Then, shop server 30 obtains attribute information relating to the application ID.

FIG. 22 shows an example of data registered in application database 311. In application database 311, for each application program, an application ID and attribute information of the application program are registered. In this example, the attribute information includes the title of the application program and a URL (an example of location information) via which the application program is purchased online. For example, if the application ID included in the inquiry is "CDF507," shop server 30 obtains the title "Everybody's Party" and a corresponding URL, as attribute information.

Referring to FIG. 21 again, in step S334, shop server 30 transmits a response to the inquiry to post server 20, the source of the inquiry. The response includes the application ID and the attribute information extracted in step S333.

In step S335, post server 20 generates a new community. More specifically, post server 20 registers attribute information of the new community in community database 213. Information registered here includes the application ID and the attribute information received from shop server 30. In step S336, post server 20 generates data showing pages of the community in a predetermined data format. In this example, the pages include buy button 95.

In step S337, game application 53 displays images of pages of the community. The images include buy button 95. If the user clicks buy button 95, a web site via which the application program is purchased on-line is accessed.

According to the process shown in FIG. 21, a burden of an administrator of post server 20 to manage the subject community can be reduced. Further, if there are a huge number of software products, a burden of an administrator of post server 20 to prepare a community for each software product can be reduced.

4. Modification

The technology is not restricted to the embodiment described above. Various modifications can be applied to the exemplary embodiment. Some modifications will be described below. Two or more modifications from among the following modifications may be combined.

4-1. First Modification

The software configuration of information-processing device 10 is not restricted to the example described in the embodiment. For example, in the above embodiment, access module 514 is included in the system software. However, an access module may be included in an application program. In another example, system software 51 may include a function corresponding to portal software 52. As long as the functions shown in FIG. 4 are implemented, assignment of the functions to an application program and the system software may be performed by any method. Alternatively, a single program may include all the functions described above.

4-2. Second Modification

A method for identifying the application program being executed, is not restricted to the example described in the above embodiment. In the above embodiment, description is given of an example in which OS 511 monitors the application program being executed, and application identifying module 512 identifies the application program being executed by the application ID notified by OS 511. However, the application program may notify its own application ID to application identifying module 512. In another example, information-processing device 10 may transmit an inquiry of the application ID of the application program being executed, and may notify application identifying module 512 of the application ID that is notified by a server. In such a case, the server holds the application ID of the application program being executed by inquiring to the system software of information-processing device 10 or by inquiring to the application program, or by receiving notification from the system software or an application program.

4-3. Third Modification

At least a part of the functional elements shown in FIG. 4 may be omitted. For example, information-processing device 10 may not include identification-generating unit 17. In such a case, the application ID obtained by information-processing device 10 may be the URL itself or a part of the URL.

4-4. Fourth Modification

Information-processing device 10 may have a function to execute plural application programs in parallel, a so-called multi task function. In this case, information-processing device 10 identifies as the application program being executed one application program that is active (more specifically, is executed in the foreground, or is focused for inputting) at the timing when access to post server 20 is instructed, from among plural application programs parallelly executed.

4-5. Fifth Modification

Portal software 52 may be preinstalled in information-processing device 10. In other words, even in a case that portal software 52 is not the system software, portal software 52 may be installed when game application 53 is executed.

4-6. Sixth Modification

In FIG. 22, an example in which the generation of a new community is triggered by posting is shown. However, an event that triggers the generation of a new community is not restricted to posting. Post server 20 may generate a new community in response to an event in which information including an application ID is received.

4-7. Seventh Modification

In the flow shown in FIG. 22, a device to which an inquiry is transmitted when the received application ID is unknown is not restricted to shop server 30. The inquiry may be transmitted to a server device other than shop server 30. In such a case, post server 20 may change a device to which the inquiry is transmitted, depending on the application ID. For example, if a character string showing a vendor of the application program is included in the application ID, post server 20 may change a device to which the inquiry is transmitted, depending on the vendor of the application program.

4-8. Other Modifications

Information-processing device 10 is not restricted to a console type game device. Information-processing device 10 may be a device other than a console type game device, for example, a portable game device, a personal computer, a mobile phone, a PDA (Personal Digital Assistants), or a tablet device. Further, an application program executed in information-processing device 10 is not restricted to a game application. The application program may be other than the game application, for example, a word processing application, educational application, or any other utility software.

The hardware configuration of information-processing device 10 is not restricted to the example shown in FIG. 5. Information-processing device 10 may have any hardware configuration as long as the functions shown in FIG. 4 can be implemented in information-processing device 10. For example, information-processing device 10 may have an input device including a display device (for example, a controller including a touch screen). The display device is different from display device 50. In such a case, portal software 52 controls display device 50 and the screen of the input device to display an image relating to posted information sharing system 1. Alternatively, portal software 52 may control the input device to display an image relating to posted information sharing system 1, and control display device 50 to display another image (for example, wallpaper). To display an image relating to posted information sharing system 1 on both display device 50 and the input device or to display the image on only the input device, may be determined by an instruction input by a user. In a case that an image relating to posted information sharing system 1 is displayed on only the input device, and that the game is paused when portal software 52 is started, portal software 52 may control display device 50 to display a screen shot image of the paused game.

Sequence charts described in the above embodiment are merely examples. The order of the processes is not restricted to the examples.

Posted information is not restricted to information input by a user. A fixed phrase generated by the system or the application program may be used as the posted information.

In the above embodiment, a single information-processing device 10 functions as the information-processing system. However, the information-processing system may include a server device as well as the information-processing device. In such a case, a functional unit of the information-processing system may be implemented a process by a processor of the information-processing device, a process by a processor of the server device, or a process by cooperation of the processor of the information-processing and the processor of the server device. The processes may be assigned to the information-processing device and the server device in any way according to common knowledge of those skilled in the art. Further, the server device may be identical to or different from post server 20.

The application program executed in information-processing device 10 is not restricted to an application program that is provided in a storage medium. The application program may be provided by download via a network such as the Internet. Further, the system software of information-processing device 10 may be provided by a storage medium or by download.

What is claimed is:

1. A posted information sharing server comprising:
a server communications interface coupled to at least one processor, the server communications interface enabling the at least one processor to communicate with plural information processing devices over a data communications network;
the at least one processor being configured to enable users of the plural information-processing devices to post first items of information and second items of information over the data communications network;
a storage device operatively connected to the at least one processor, the storage device being configured to store (a) the first items of information posted over the data communications network in response to accesses by users of information processing devices executing a first application, and (b) the second items of information posted over the data communications network in response to accesses by users of information processing devices executing a second application different from the first application;
the at least one processor being further configured to allow information processing devices to access the stored first items of information and second items of information over the data communications network;
the at least one processor automatically detecting whether an accessing information processing device is currently executing the first application or was previously executing the first application and has suspended execution thereof, and whether the accessing information processing device is currently executing the second application or was previously executing the second application and has suspended execution thereof;
the at least one processor enabling the accessing information processing device to access the stored first items of information if the detecting reveals the accessing information processing device is currently executing the first application or was previously executing the first application and has suspended execution thereof;
the at least one processor enabling the accessing information processing device to access the stored second items of information if the detecting reveals the accessing information processing device is currently executing the second application or was previously executing the second application and has suspended execution thereof.

2. The server of claim 1 wherein the at least one processor automatically detects identification information of an application program from among a plural application programs that a posting information processing device was executing immediately prior to when the posting information processing device supplies the server with a post instruction over the data communications network.

3. The server of claim 2 wherein the at least one processor further automatically detects identification information of an application program from among a plural application programs that a browsing information processing device was executing immediately prior to when the browsing information processing device supplies the server with a browse instruction over the data communications network.

4. The server of claim 1 wherein the at least one processor automatically detects identification information of an application program from among a plural application programs that a browsing information processing device was executing immediately prior to when the browsing information processing device supplies the server with a browse instruction over the data communications network.

* * * * *